(12) United States Patent
Zhang et al.

(10) Patent No.: US 10,093,247 B2
(45) Date of Patent: *Oct. 9, 2018

(54) ENHANCED FRONT CURB VIEWING SYSTEM

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Kent S. Lybecker, Rochester, MI (US); Jeffrey S. Piasecki, Rochester, MI (US); Bakhtiar Brian Litkouhi, Washington, MI (US); Ryan M. Frakes, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1055 days.

This patent is subject to a terminal disclaimer.

(21) Appl. No.: 14/280,395

(22) Filed: May 16, 2014

(65) Prior Publication Data

US 2014/0347485 A1 Nov. 27, 2014

Related U.S. Application Data

(60) Provisional application No. 61/826,898, filed on May 23, 2013.

(51) Int. Cl.
*B60R 11/04* (2006.01)
*B60R 1/00* (2006.01)

(52) U.S. Cl.
CPC .............. *B60R 11/04* (2013.01); *B60R 1/00* (2013.01); *B60R 2300/302* (2013.01);
(Continued)

(58) Field of Classification Search
CPC ........... G06K 9/00791; G06K 9/00798; G06K 9/00805; G06K 9/6289; B60R 1/00
(Continued)

(56) References Cited

U.S. PATENT DOCUMENTS 5,872,432 A * 2/1999 Beeteson ............... G09G 1/165
315/382.1
6,647,383 B1 * 11/2003 August ............. G06F 17/30867
(Continued)

FOREIGN PATENT DOCUMENTS

CN 1532091 A 9/2004
CN 1637578 A 7/2005
(Continued)

OTHER PUBLICATIONS

Zhang, Wende, U.S. Appl. No. 14/210,843, filed Mar. 14, 2014, entitled "Front Curb Viewing System Based Upon Dual Cameras".
(Continued)

*Primary Examiner* — Mohammed S Rahaman
*Assistant Examiner* — Jimmy S Lee

(57) ABSTRACT

A system and method for determining when to display frontal curb view images to a driver of a vehicle, and what types of images to display. A variety of factors—such as vehicle speed, GPS/location data, the existence of a curb in forward-view images, and vehicle driving history—are evaluated as potential triggers for the curb view display, which is intended for situations where the driver is pulling the vehicle into a parking spot which is bounded in front by a curb or other structure. When forward curb-view display is triggered, a second evaluation is performed to determine what image or images to display which will provide the best view of the vehicle's position relative to the curb. The selected images are digitally synthesized or enhanced, and displayed on a console-mounted or in-dash display device.

21 Claims, 24 Drawing Sheets

(52) U.S. Cl.
CPC ... *B60R 2300/605* (2013.01); *B60R 2300/607* (2013.01); *B60R 2300/70* (2013.01)

(58) Field of Classification Search
USPC .......................................................... 348/148
See application file for complete search history.

(56) References Cited

U.S. PATENT DOCUMENTS

| | | | |
|---|---|---|---|
| 7,697,055 B2 | 4/2010 | Imoto et al. | |
| 8,688,306 B1* | 4/2014 | Nemec ................ | G05D 1/0055 104/250 |
| 8,743,202 B2 | 6/2014 | Schick et al. | |
| 2002/0171737 A1* | 11/2002 | Tullis ................. | H04N 1/00204 348/143 |
| 2002/0191837 A1* | 12/2002 | Takeda .................. | G01C 11/06 382/154 |
| 2003/0197660 A1* | 10/2003 | Takahashi .......... | G06K 9/00791 345/7 |
| 2010/0253543 A1* | 10/2010 | Szczerba ............... | B60Q 9/005 340/932.2 |
| 2012/0069187 A1* | 3/2012 | Ozaki ...................... | B60R 1/00 348/148 |
| 2012/0105643 A1* | 5/2012 | Ozaki ...................... | B60R 1/00 348/148 |
| 2013/0116859 A1* | 5/2013 | Ihlenburg ................ | G06F 17/00 701/2 |
| 2013/0253754 A1* | 9/2013 | Ferguson ............. | G05D 1/0231 701/28 |
| 2013/0261950 A1* | 10/2013 | Sasabuchi ............ | B61L 23/041 701/301 |
| 2013/0314503 A1* | 11/2013 | Nix .................... | G06K 9/00805 348/46 |
| 2014/0104424 A1 | 4/2014 | Zhang et al. | |
| 2015/0227775 A1* | 8/2015 | Lewis ................. | G06K 9/0063 345/419 |

FOREIGN PATENT DOCUMENTS

| | | |
|---|---|---|
| CN | 101088027 A | 12/2007 |
| JP | 2003274394 A | 9/2003 |
| WO | WO-2009086967 A1 | 7/2009 |

OTHER PUBLICATIONS

First Office Action for Chinese Application No. 201410391689.5 dated Dec. 18, 2015 with English language translation; 15 pages.
Second Office Action for Chinese Application No. 201410391689.5 dated Aug. 9, 2016 with English language translation; 8 pages.

* cited by examiner

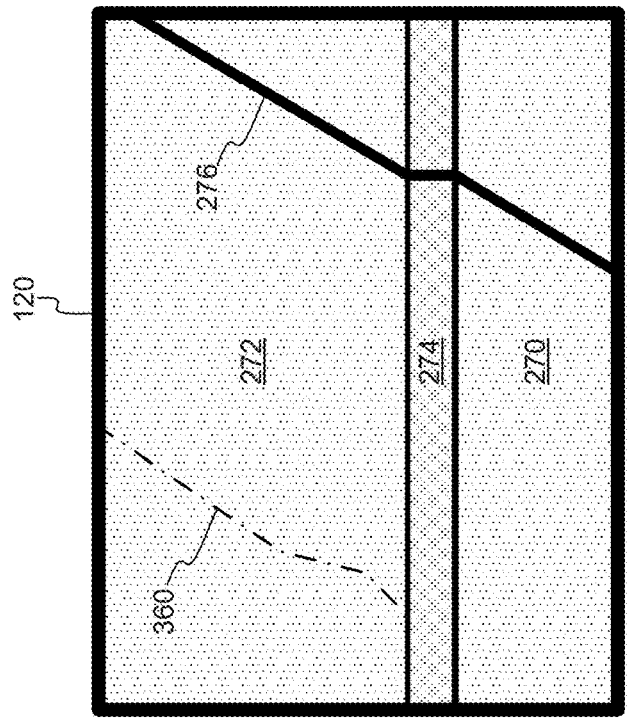
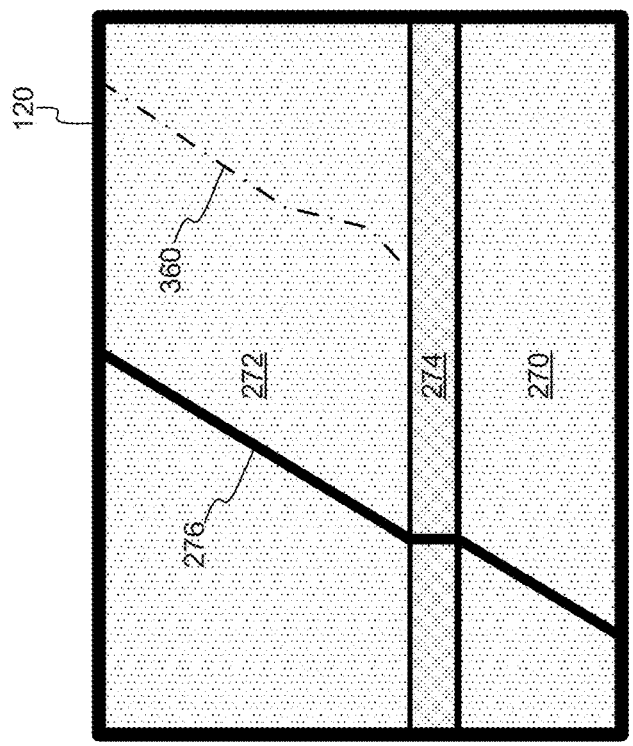

ENHANCED FRONT CURB VIEWING SYSTEM

CROSS-REFERENCE TO RELATED APPLICATIONS

This application claims the benefit of the priority date of U.S. Provisional Patent Application Ser. No. 61/826,898, titled ENHANCED FRONT CURB VIEWING SYSTEM, filed May 23, 2013.

BACKGROUND OF THE INVENTION

Field of the Invention

This invention relates generally to the display of enhanced images of curbs and other structures in front of a vehicle and, more particularly, to a system and method for determining when a curb or other structure is present in proximity to the front of a vehicle, determining whether or not to display images of the curb or object on a cockpit display device based on vehicle situation, determining which of several image types to display, and constructing and displaying the images.

Description of the Related Art

Vehicles equipped with forward-view cameras have become increasingly common in recent years. Images from forward-view cameras are used for a variety of applications, including lane departure warning and collision warning. In these applications, the camera images are not displayed to the vehicle driver, but rather, the images are analyzed by a vehicle computer using image processing techniques, lane boundaries and potential obstacles are detected from the images, and warnings are issued to the driver as needed.

Even as the advent of new technology has made compact, reliable and affordable digital cameras a reality, an age-old problem continues to beset drivers. That problem is the inability of drivers to accurately judge the position of the front of the vehicle relative to an obstacle, such as a curb, when parking. Because of the inherent inability of a driver to see a curb when pulling into a parking space due to the obstruction from the front of the vehicle, the driver is forced to estimate how far to pull forward—hopefully without hitting the curb. This judgment can be difficult, as it relies on past experience, peripheral visual cues and other indirect information. If the driver judges the forward clearance incorrectly, the vehicle may not be pulled far enough into the parking space, or worse, the front of the vehicle may hit the curb, causing damage to the vehicle.

During a parking maneuver, the driver is usually concentrating on many facets of parking the vehicle, and may not think to manually turn on a front curb viewing display. However, if a front curb viewing system automatically displayed the most appropriate frontal images based on the context of the parking maneuver, most drivers would find this visual information helpful—particularly if the system not only selected the one or more views which provide the most assistance to the driver, but also produced enhanced views with corrections for visual distortions which are inherently present in wide-angle lens images.

There is a need for a forward-view parking assist system which takes advantage of the available images of curbs and other structures in front of vehicles, and provides drivers with optimized images which enable the driver to precisely position the front of the vehicle relative to the curb or other frontal object.

SUMMARY OF THE INVENTION

In accordance with the teachings of the present invention, a system and method are disclosed for determining when to display frontal curb view images to a driver of a vehicle, and what types of images to display. A variety of factors—such as vehicle speed, GPS/location data, the existence of a curb in forward-view images, and vehicle driving history—are evaluated as potential triggers for the curb view display, which is intended for situations where the driver is pulling the vehicle into a parking spot which is bounded in front by a curb or other structure. When forward curb-view display is triggered, a second evaluation is performed to determine what image or images to display which will provide the best view of the vehicle's position relative to the curb. The selected images are digitally synthesized or enhanced, and displayed on a console-mounted or in-dash display device.

Additional features of the present invention will become apparent from the following description and appended claims, taken in conjunction with the accompanying drawings.

BRIEF DESCRIPTION OF THE DRAWINGS

FIGS. 16A and 16B are illustrations of virtual top-down views from the left front camera and the right front camera, respectively;

DETAILED DESCRIPTION OF THE EMBODIMENTS

The following discussion of the embodiments of the invention directed to a system and method for providing enhanced front curb view images is merely exemplary in nature, and is in no way intended to limit the invention or its applications or uses. For example, the invention described below has particular application for front curb view imaging for vehicles. However, the invention is also applicable to other motorized devices, such as forklifts, and may also be useful in rear-view or side-view situations.

Figure 1:
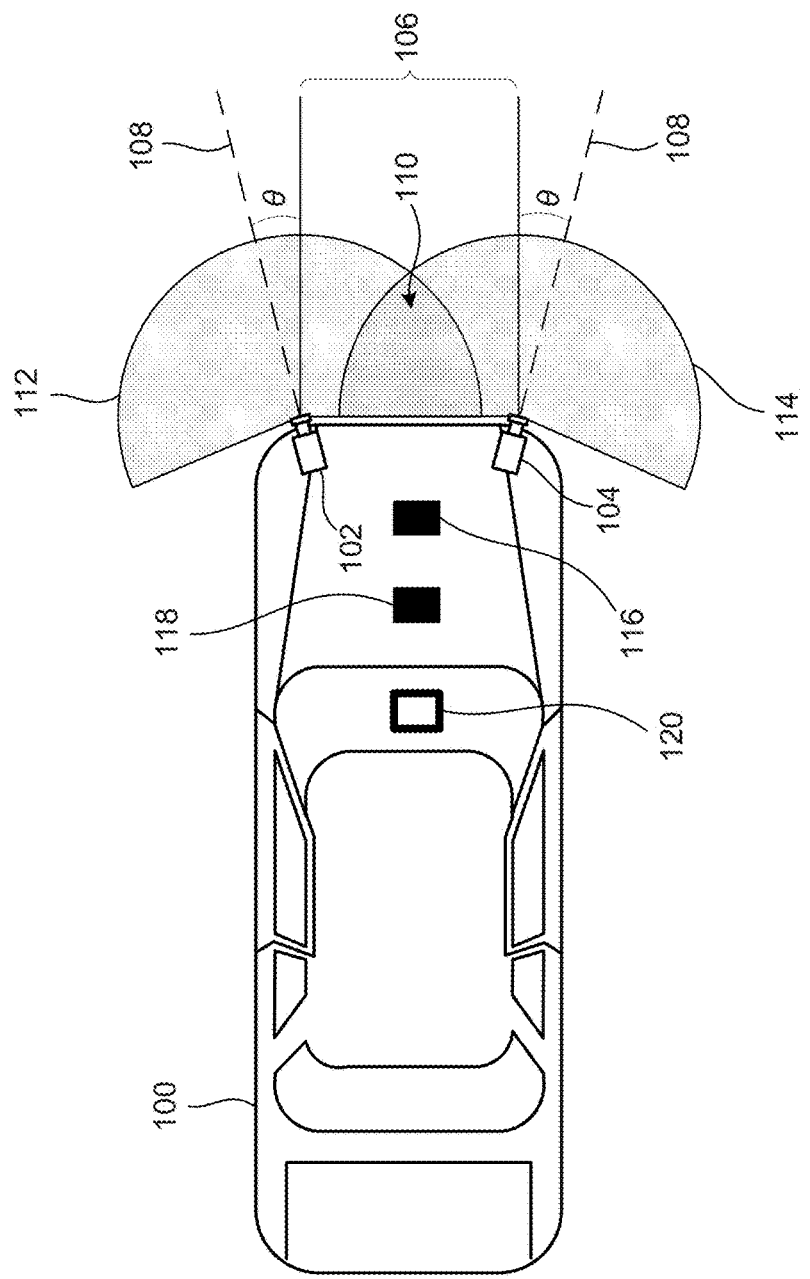
FIG. 1 is a top view of a vehicle including frontal cameras which can be used for curb viewing.

FIG. 1 is a top view of a vehicle 100 including frontal cameras which can be used for curb viewing. The vehicle 100 includes a pair of cameras 102, 104 positioned behind the grill or in the front bumper of the vehicle 100. The first (or left) camera 102 is spaced apart by a horizontal or lateral distance 106 from the second (or right) camera 104. The distance 106 will vary depending upon the make and model of the vehicle 100, but in some embodiments may be approximately one meter. The cameras 102 and 104 have an optical axis 108 that is offset from the forward direction of the vehicle by a pan angle θ. The angle θ which is employed may vary depending upon the make and model of the vehicle 100, but in some embodiments is approximately 10°. Whatever orientation is selected for the cameras 102 and 104, each camera captures an ultra-wide field of view (FOV) using a fish-eye lens to provide approximately a 180° FOV that partially overlaps at area 110. The FOV of the camera 102 is represented by sector 112, and the FOV of the camera 104 is represented by sector 114. The images captured by the cameras 102 and 104 may be received by a video acquisition device 116, and the images further processed in a processor 118 having image processing hardware and/or software as will be discussed in detail below, to provide one or more types of driver assisting images on a display device 120.

The processor 118 is a computing device including at least a microprocessor and a memory module, of any type commonly used in vehicles. The processor 118 may be a general purpose device which also performs other computing functions, or the processor 118 may be a custom design which is configured specifically for front curb view image processing. In any case, the processor 118 is configured to perform the steps of the methods discussed herein. That is, the methods for enhanced curb viewing are intended to be carried out on a computing device such as the processor 118, not in a person's head or using paper and pencil.

Figure 2:
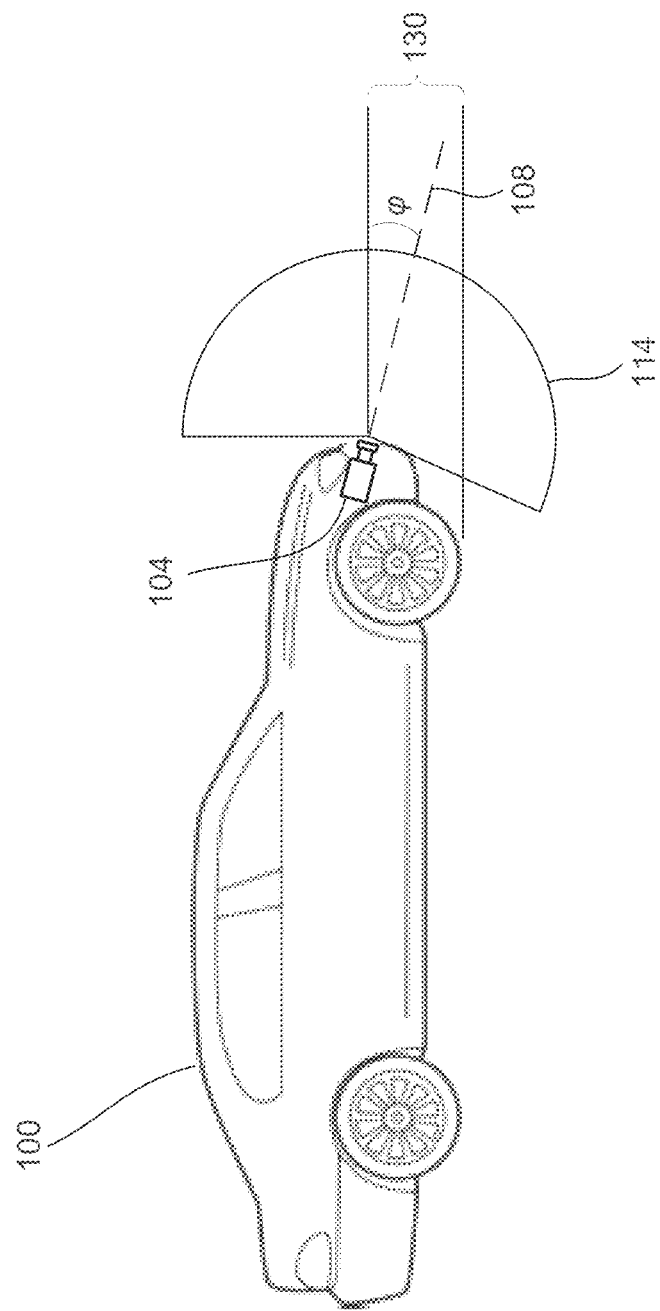
FIG. 2 is a side view illustration of the vehicle of FIG. 1, showing further details of the camera arrangement.

FIG. 2 illustrates a side view of the vehicle 100. The right camera 104 is shown positioned by a distance 130 above the road/ground. The distance 130 will depend upon the make and model of the vehicle 100, but in some embodiments is approximately one-half meter. Knowing the distance 130 is useful for computing virtual images from the field of view 114 to assist the driver of the vehicle 100. The camera 104 (and camera 102 on the opposite side of the vehicle) is typically aligned such that it is slightly angled downward by a tilt angle φ to provide the field of view 114 as shown. The angle φ will vary by make and model of the vehicle 100, but in some embodiments may be approximately 10°.

As discussed above, the dual front camera arrangement of FIGS. 1 and 2 is common on vehicles today, with the images typically being used in collision avoidance and lane departure warning applications. As also discussed above, the front camera images can also be used for curb viewing as a driver aid. However, until now, there has not been an automated system for providing enhanced front curb viewing in situations where desired by the driver.

Figure 3:
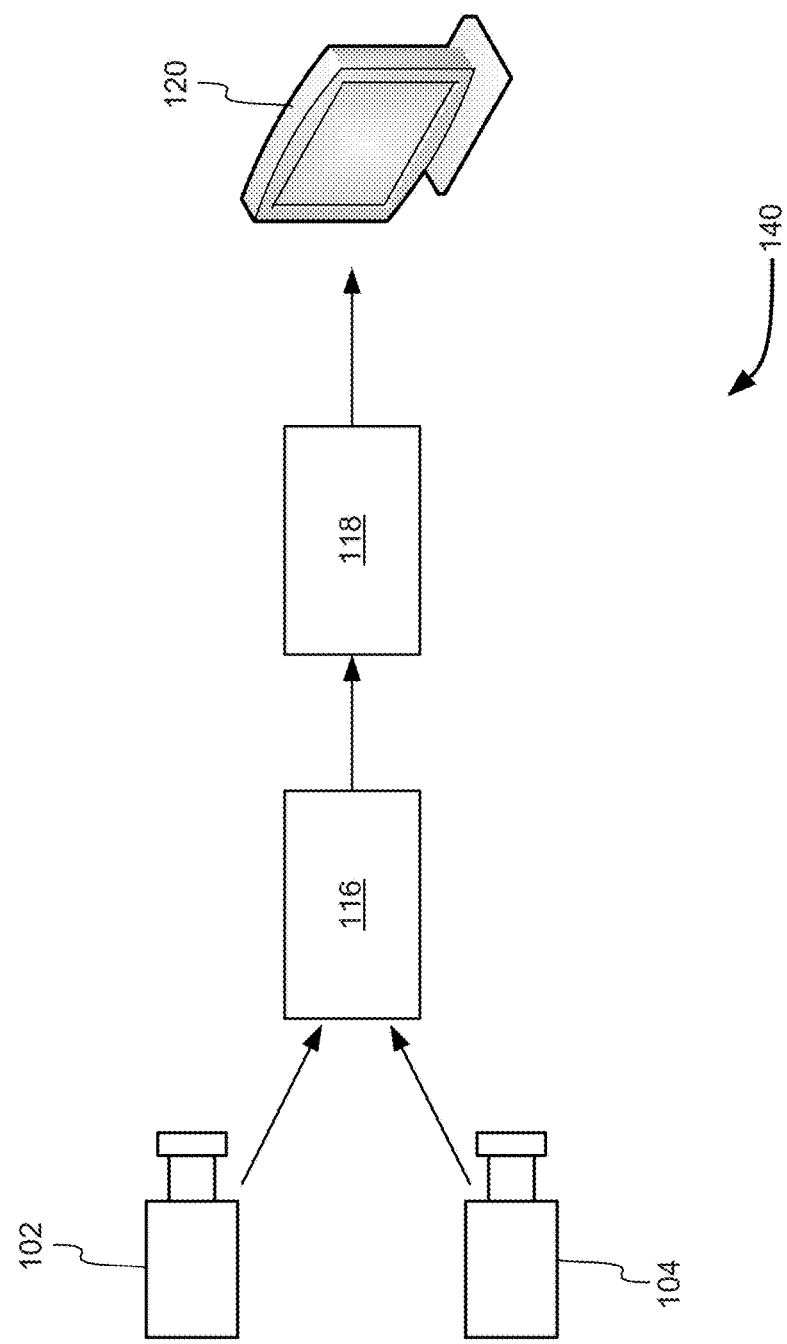
FIG. 3 is a schematic diagram of a system for automated and enhanced curb viewing.

FIG. 3 is a schematic diagram of a system 140 for automated and enhanced curb viewing. The system 140 includes elements discussed above with respect to FIG. 1, including the front cameras 102 and 104, the video acquisition device 116, the processor 118 and the display device 120. FIG. 3 provides a high-level depiction of the system 140, showing the basic elements. As could be expected, the processor 118 can include many different functions and modules, which will be discussed in the figures that follow.

Figure 4:
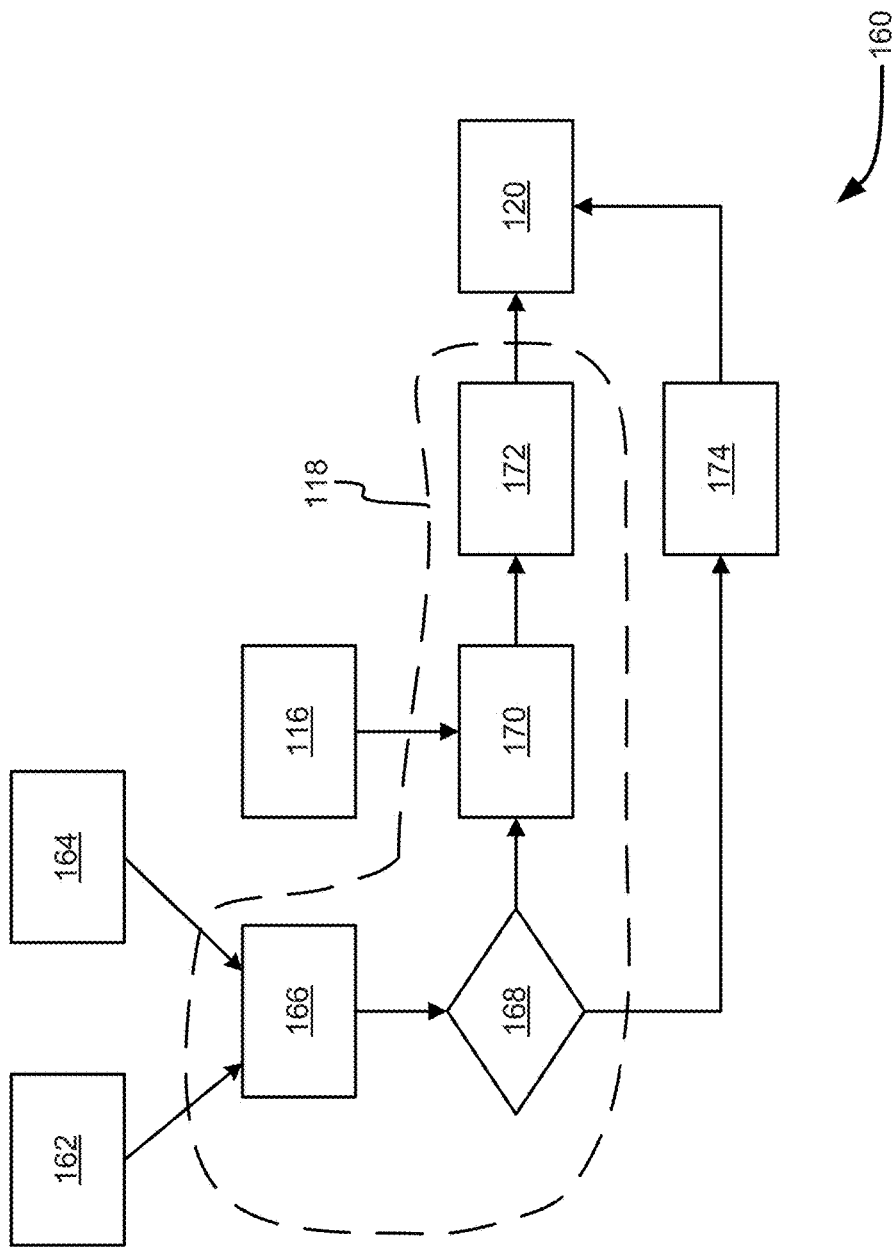
FIG. 4 is a block diagram of a system which is a first embodiment of an enhanced curb viewing system.

FIG. 4 is a block diagram of a system 160 which is a first embodiment of an enhanced curb viewing system. This first embodiment is a simple design in which a user command is the primary trigger for initiating front curb viewing. A user input 162 provides a signal from the driver of the vehicle 100 if the driver wants to view front curb images. The user input 162 may be a physical button, a switch, a virtual button on a touch screen device such as the display device 120, an audio microphone for detecting a spoken command, or other type of input. When the driver activates the user input 162, this is taken as a trigger to provide front curb images on the display device 120, but only if the vehicle speed is below a certain threshold, which may be a regulatory requirement. A vehicle speed signal is provided from a vehicle state module 164, which may include data from various vehicle sensors, including vehicle speed, steering angle, yaw rate, longitudinal and lateral acceleration, etc.

If the user input 162 has been activated and the vehicle speed is below the threshold, then a trigger module 166 sets a front curb viewing image status to yes. A switch 168 determines what to display on the display device 120. If the front curb viewing image status is equal to yes, then the switch 168 commands a processing module 170 to compute enhanced front curb viewing images using image input from the video acquisition device 116. Finally, a mode selection module 172 determines what view or views should be displayed on the display device 120. In the simple embodiment of the system 160, the mode selection module 172 may select a default arrangement of images (including, for example, a forward perspective view and a virtual top-down curb view—discussed in detail later). The mode selection module 172 may also support user selection of viewing mode—by way of the user input 162, for example.

If the front curb viewing image status is equal to no, then the switch 168 passes control to a display control module 174, which displays other information on the display device 120. For example, when the driver is not viewing front curb images, the display device 120 could serve as a radio or other audio/video interface, or a navigation map display, or any other appropriate function.

The trigger module 166, the switch 168, the processing module 170 and the mode selection module 172 can all be considered to be included in the processor 118 discussed previously. That is, the elements 166-172, which each perform a separate function, do not need to be separate physical devices, but rather can be embodied in hardware or software which is all included in the processor 118.

Figure 5:
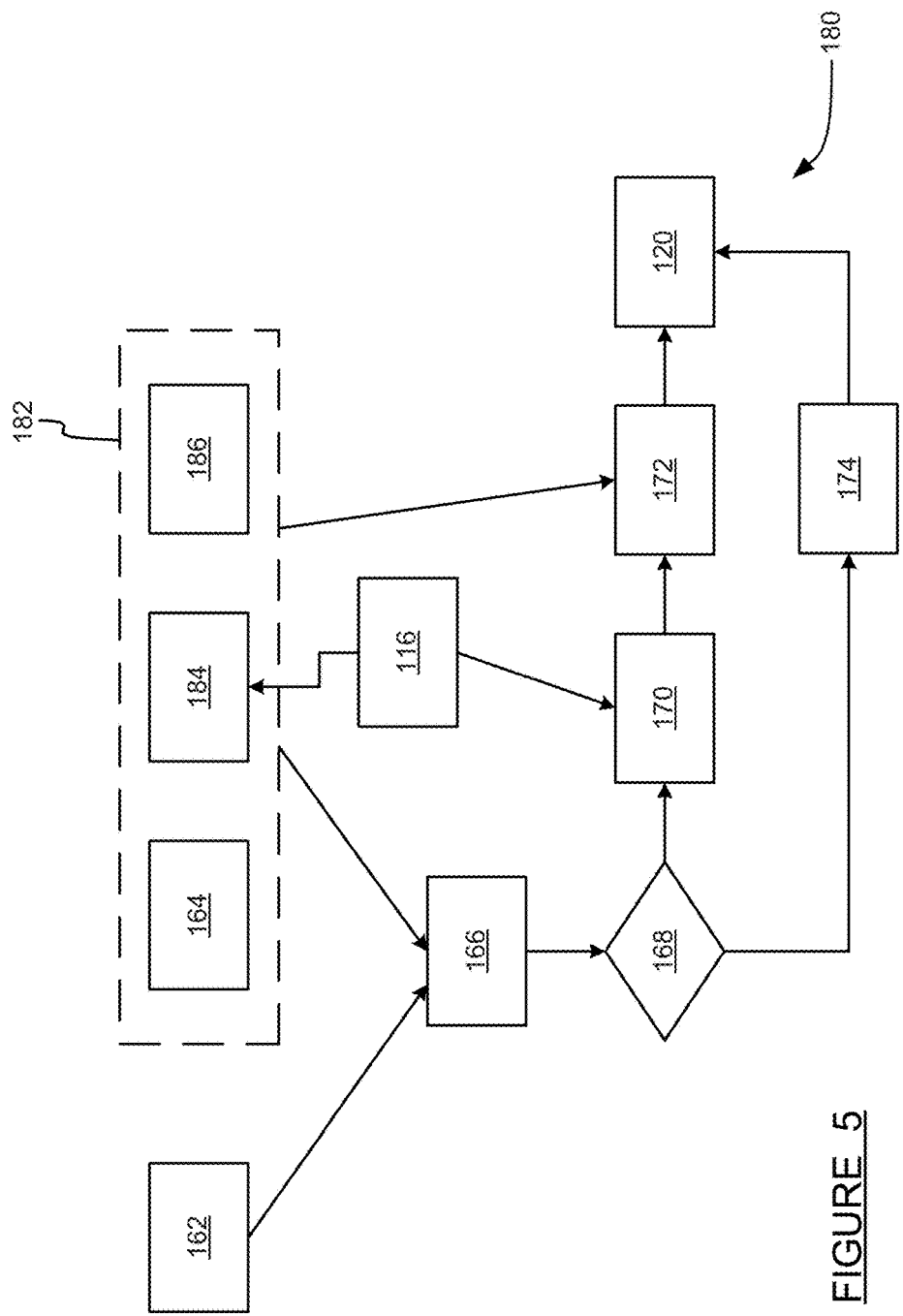
FIG. 5 is a block diagram of a system which is a second embodiment of an enhanced curb viewing system.

FIG. 5 is a block diagram of a system 180 which is a second embodiment of an enhanced curb viewing system. This second embodiment includes additional triggering signal sources for initiating front curb viewing. The user input 162 still offers a direct means for the driver of the vehicle 100 to indicate that he/she wants to view front curb images, if the vehicle speed is below the threshold. However, in addition to the user input 162, a heuristics module 182 uses various data sources to evaluate the vehicle's operating environment, and applies rules to determine when front curb viewing is likely to be desired by the driver. The heuristics module 182 includes the vehicle state module 164 discussed previously, which not only provides a vehicle speed signal for comparison to the speed threshold, but may also provide steering angle, yaw rate, longitudinal and lateral acceleration and other data. Rules can be defined which trigger front curb viewing when, for example, vehicle speed is low and steering angle is high, indicating a likely parking lot maneuver.

The heuristics module 182 also includes an object detection module 184, which receives camera images from the video acquisition device 116. The object detection module 184 analyzes the front camera images to detect a parking spot, a curb, or any other object ahead of the vehicle 100. If a parking spot is detected, and if other vehicle parameters such as speed are appropriate, it may be inferred that the driver is maneuvering the vehicle 100 to park in the detected parking spot. This would cause the heuristics module 182 to issue a trigger signal to activate front curb viewing. Even in absence of a detected parking spot, the presence of a curb ahead of the vehicle 100 may also cause the heuristics module 182 to issue a trigger signal to activate front curb viewing. The curb could be a stand-alone unit with a definite left and right end, or it could be a continuous raised sidewalk as is common in many commercial building parking lots. Likewise, any other object detected immediately ahead of the vehicle 100—such as a wall, one or more posts, a fence, etc.—may trigger front curb viewing signal from the object detection module 184 of the heuristics module 182.

The heuristics module 182 also includes a GPS/map module 186, which uses vehicle position data from an onboard Global Positioning System (GPS) receiver, along with data from a digital map and/or navigation system, to determine when the vehicle 100 is likely to be in a parking situation. For example, it can easily be determined from GPS and digital map data that the vehicle 100 is in a parking lot at a mall, or in a parking lot at an office building. This knowledge may be used to begin a search for a parking spot or curb using the object detection module 184, or the knowledge may be used to directly trigger front curb viewing if vehicle parameters such as speed and steering angle (from the vehicle state module 164) meet certain criteria.

The heuristics module 182 evaluates all available data, as discussed above, and determines whether front curb viewing is likely to be desired by the driver, based on a set of pre-established rules. Of course, if curb viewing is selected via the user input 162, then front curb viewing is activated (as long as the vehicle speed is below the threshold), regardless of what determination is made by the heuristics module 182. Likewise, if the driver indicates via the user input 162 that curb viewing is not wanted, then front curb viewing is deactivated, regardless of what determination is made by the heuristics module 182.

The user input 162 and the heuristics module 182 provide signals to the trigger module 166, which sets the front curb viewing image status to yes or no depending on the signals. As in the first embodiment, the switch 168 determines what to display on the display device 120. If the front curb viewing image status is equal to yes, then the switch 168 commands the processing module 170 to compute enhanced front curb viewing images using image input from the video acquisition device 116. Finally, the mode selection module 172 determines what view or views should be displayed on the display device 120.

In the second embodiment represented by the system 180, the mode selection module 172 can select a preferred display mode based on the context of the situation as defined by data from the heuristics module 182. For example, if the vehicle 100 is being steered to the right, or if a parking spot is detected ahead and to the right of the vehicle 100, then a front-right perspective view may be chosen for the display mode, possibly along with a virtual top-down view. Many combinations of views may be defined in the display modes. Likewise, many different factors may be considered in the logic for selecting the display mode, with the objective being to display the view or views which provide the most driver assistance in the context of the current parking situation. The mode selection module 172 may also support user selection of viewing mode—by way of the user input 162, for example.

If the front curb viewing image status is equal to no, then the switch 168 passes control to the display control module 174, which displays other information on the display device 120, as discussed previously. The trigger module 166, the switch 168, the processing module 170 and the mode selection module 172 can all be considered to be included in the processor 118, as also discussed previously. In addition, the heuristics module 182 of the system 180 can also be included in the processor 118.

Figure 6:
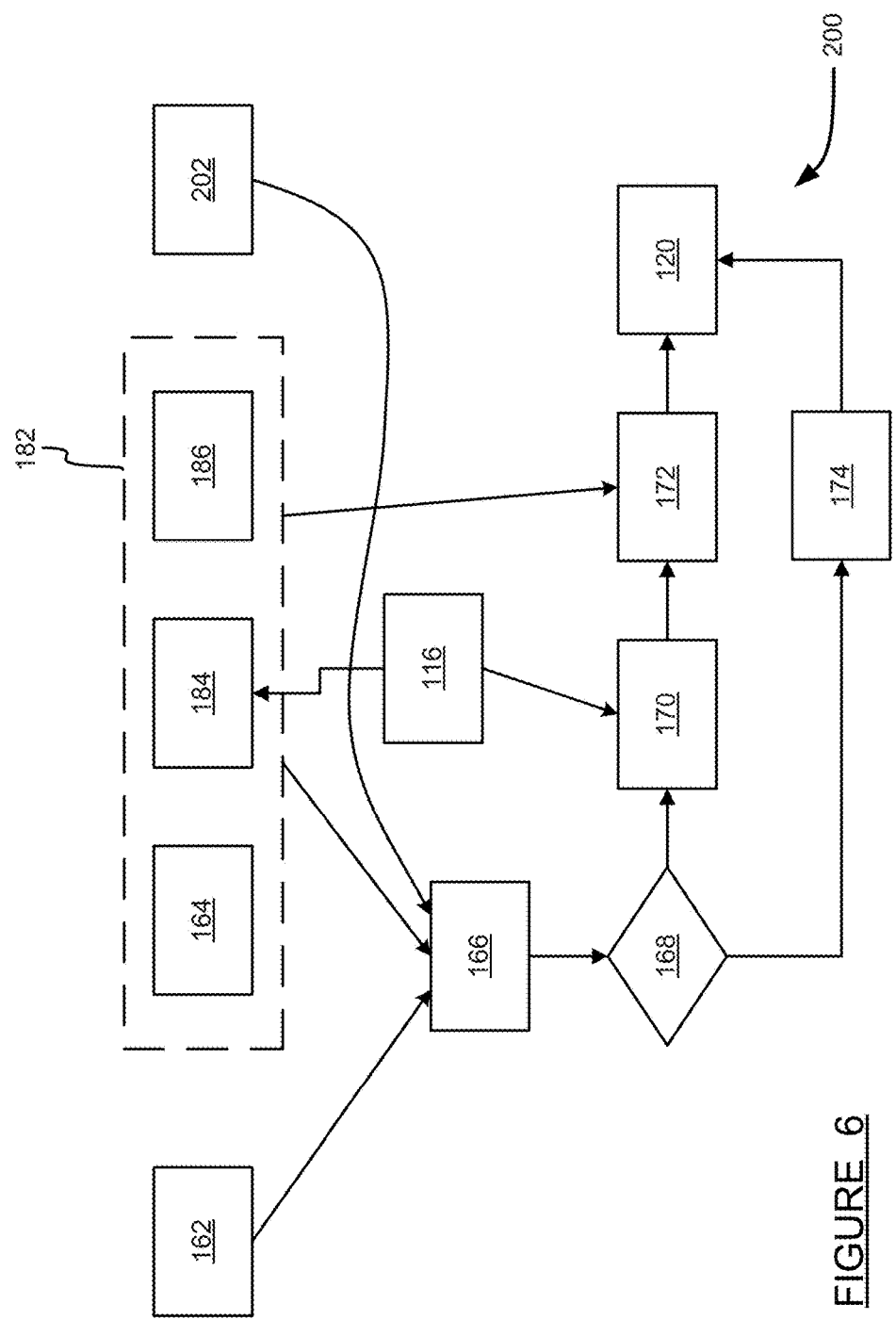
FIG. 6 is a block diagram of a system which is a third embodiment of an enhanced curb viewing system.

FIG. 6 is a block diagram of a system 200 which is a third embodiment of an enhanced curb viewing system. The system 200 includes all of the elements of the system 180 (the second embodiment) discussed above. However, this third embodiment includes yet another triggering signal source for initiating front curb viewing. A behavior/history learning module 202 uses machine learning techniques to determine when it is likely that the driver of the vehicle 100 wants to view front curb images. The learning module 202 provides a signal to the trigger module 166, which sets the front curb viewing image status to yes or no depending on three signal sources. The learning module 202 may also learn driver preferences for display modes—that is, what view or views to display in what parking situations—and may provide that data to the mode selection module 172 (via the trigger module 166, as shown in FIG. 6, or directly).

Figure 7:
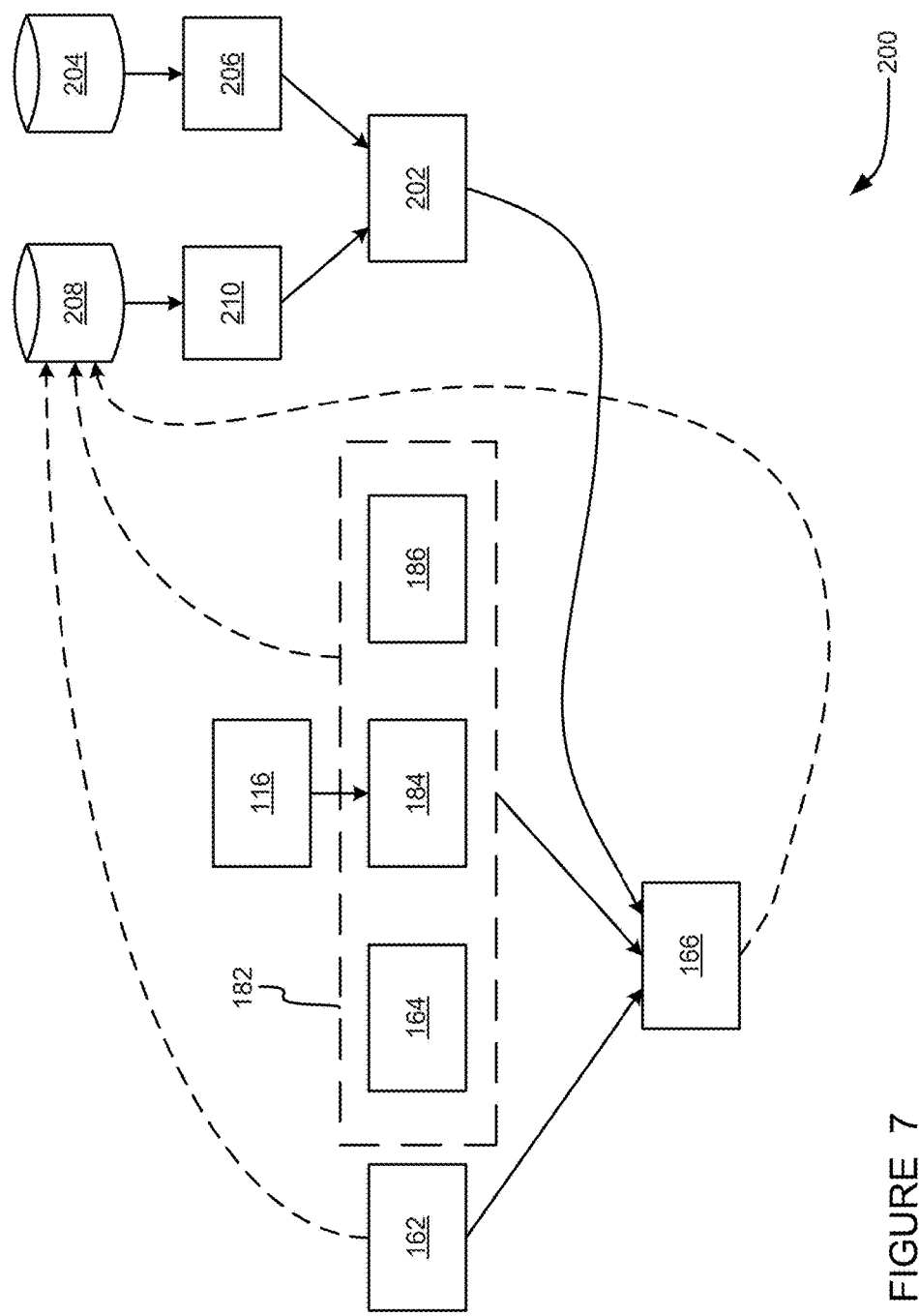
FIG. 7 is a block diagram of the system of FIG. 6, showing how the learning module operates.

FIG. 7 is a block diagram of the system 200 showing how the learning module 202 works. Elements of the system 200 which do not interact with the learning module 202—specifically, everything below the trigger module 166—are omitted from FIG. 7 for simplicity. The learning module 202 includes both off-line or preprogrammed learning and adaptive learning. A database 204 contains data representing a general population of drivers. The database 204 is preprogrammed and is available when the vehicle 100 is new. The database 204 is not continuously updated, but may be periodically updated (via a telematics service, for example) with new data for a general population of drivers. Data from the database 204 is used in an off-line learning module 206 to make a first determination of whether front curb viewing is desired, and this is communicated via a signal from the off-line learning module 206 to the learning module 202.

A database 208 continuously collects data from the user input 162, the heuristics module 182 and the trigger module 166 during vehicle operation. The data from the database 208 is used in an adaptive learning module 210 to make a second determination of whether front curb viewing is desired, and this is communicated via a signal from the adaptive learning module 210 to the learning module 202. The adaptive learning module 210 applies machine learning techniques to the data from the database 208 to determine whether front curb viewing should be triggered in a current situation based on whether front curb viewing was triggered in similar circumstances previously. For example, it may be apparent in the data that the driver of the vehicle 100 frequently activates front curb viewing at a certain vehicle location, even though map data does not identify the location as a parking lot. In this situation, when the vehicle 100 again arrives at the location, and when vehicle speed is below the threshold, the adaptive learning module 210 can trigger front curb viewing. This analysis can be further enhanced to include recognition of a specific pattern of steering maneuvers which the driver may typically follow to reach a certain parking space.

As another example, the adaptive learning module 210 may determine that the driver of the vehicle 100 typically does not want front curb viewing when approaching curbs and sidewalks (maybe because the vehicle 100 has high ground clearance), but the driver does want front viewing when approaching posts, walls and fences. This pattern can be detected in the data from the object detection module 184 and the user input 162. All of these types of determinations can be made by evaluating not just the data from the three parts of the heuristics module 182, but also data from the user input 162 and the trigger module 166. That is, it is important to consider not only the circumstances in which front curb viewing was previously activated, but also to consider the driver's preferences as indicated by manually activating or deactivating front curb viewing via the user input 162.

The adaptive learning module 210 can also distinguish between different drivers of the vehicle 100, by way of a key fob identifier or other driver recognition techniques, and can adapt accordingly. For example, two drivers of the vehicle 100 may have very different preferences for front curb viewing, where one driver may never want to use it and the other driver may use it frequently. On the other hand, both drivers of the vehicle 100 may have the same "home" location, and it may be determined that both drivers prefer to activate curb viewing at the home location. These types of driver-specific and/or vehicle-specific determinations can easily be made by the adaptive learning module 210. The ability to learn the preferences of drivers of the vehicle 100 as it is driven distinguishes the adaptive learning module 210 from the off-line learning module 206 and the heuristics module 182.

Figure 8:
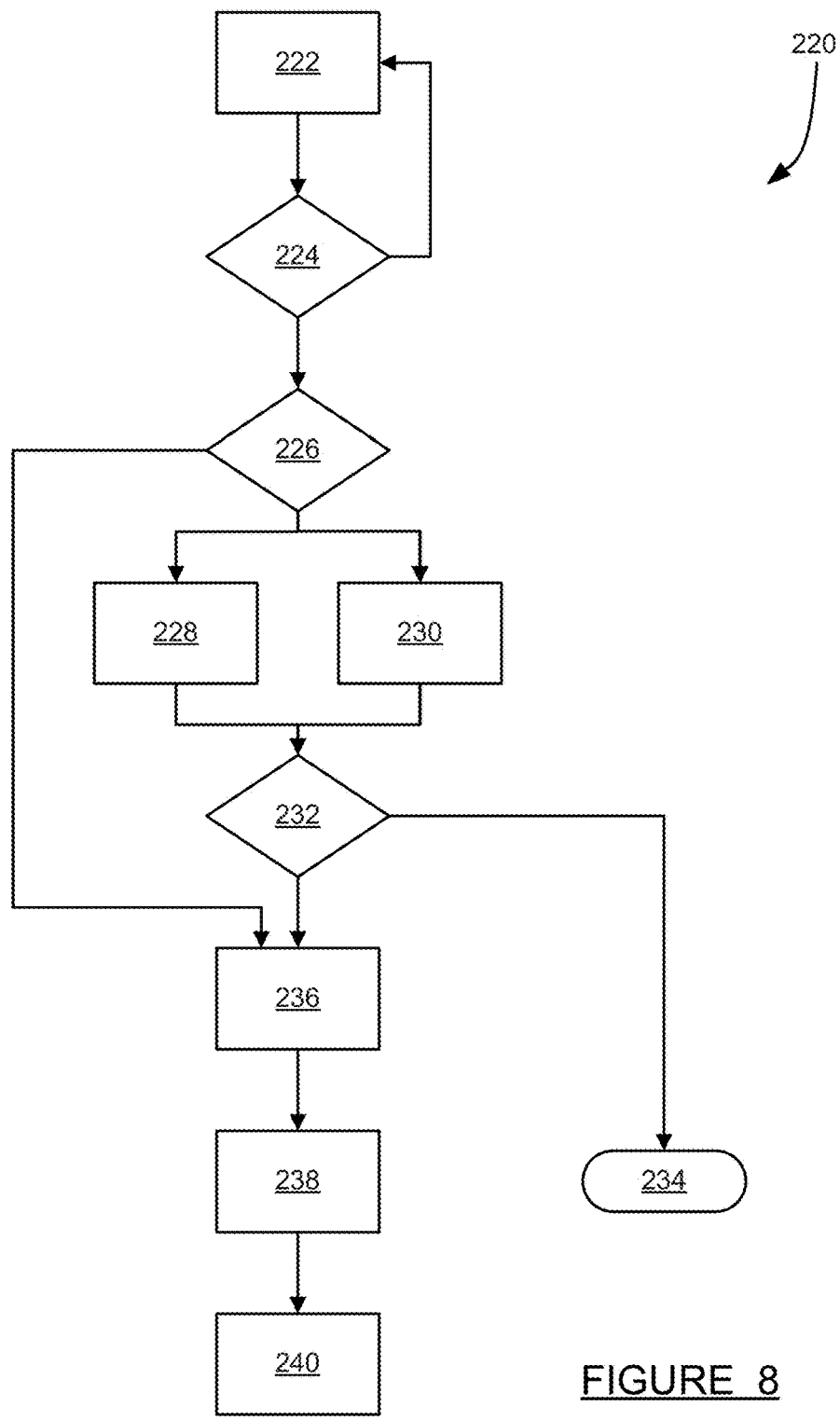
FIG. 8 is a flowchart diagram of a method for providing enhanced front curb viewing in a vehicle.

FIG. 8 is a flowchart diagram 220 of a method for providing enhanced front curb viewing in a vehicle. At box 222, a vehicle speed signal is read from a vehicle speed sensor. At decision diamond 224, it is determined whether the vehicle speed is below a speed threshold, which may be defined by government regulation for displaying front curb view images. If the vehicle speed is not below the threshold, the method loops back to the box 222 until such time as the vehicle speed is below the threshold. If the vehicle speed is below the threshold at the decision diamond 224, then at decision diamond 226 it is determined whether the vehicle driver has selected front curb viewing via the user input 162.

If the driver has not selected front curb viewing, then at box 228, the vehicle operating environment is evaluated to determine whether any factors indicate that front curb viewing should be activated. The vehicle operating environment evaluation is performed by the heuristics module 182, and includes factors such as vehicle speed and steer angle, the presence of a parking spot, a curb or other obstacle in front of the vehicle, and vehicle location as indicated by GPS and digital map. At box 230, the driving behavior and history of the vehicle is evaluated by the learning module 202 to determine whether front curb viewing should be triggered in a current situation based on whether front curb viewing was triggered in similar circumstances previously. At decision diamond 232, the signals from the boxes 228 and 230 are evaluated to determine whether any triggers exist which indicate that front curb viewing should be activated. If no such triggers exist, then at terminus 234 the process ends and other information (such as radio or navigation) is displayed on the display device 120.

If the driver has selected front curb viewing at the decision diamond 226, or triggers exist at the decision diamond 232 which indicate that front curb viewing should be activated, then at box 236 the video signals from the video acquisition device 116 are processed to produce enhanced front curb viewing images. At box 238, a display mode for front curb viewing is selected, based on past driver preference and/or the context of the current parking situation, as discussed previously. At box 240, the enhanced front curb view images are displayed according to the selected display mode.

Using the techniques described above, an enhanced front curb viewing system can be delivered which provides the vehicle driver with valuable visual assistance for maneuvering near curbs and other obstacles in front of a vehicle. The enhanced front curb viewing system uses an existing display device and cameras, and provides the driver with visual information which would otherwise be unavailable—thereby resulting in far fewer incidents of vehicle damage due to contact with frontal obstacles.

As can be understood from the above discussion, the selection and display of certain frontal views is essential to the effectiveness of a front curb viewing system. Views can include both enhanced versions of native camera views (such as a forward perspective view from the left or right camera) and "virtual views", which are views which are synthesized by processing multiple camera images to produce a view perspective which none of the cameras records directly.

Figure 9:
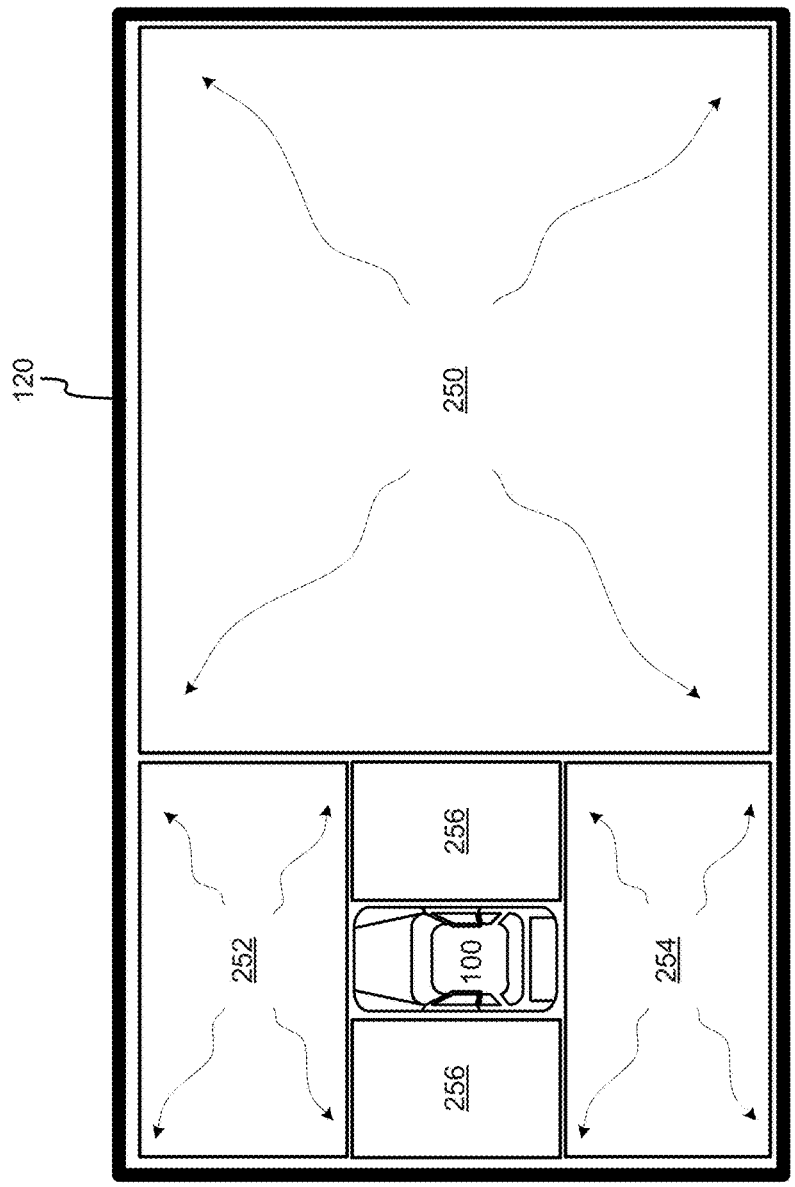
FIG. 9 is an illustration of the display device shown in FIG. 3, showing an example display mode, or arrangement of views on the screen of the display device.

FIG. 9 is an illustration of the display device 120, showing an example display mode, or arrangement of views on the screen of the display device 120. The example shown in FIG. 9 includes at least three image views, where the right side of the display device 120 includes a view 250, which is a forward perspective view (enhanced perspective view creation is discussed below). The left side of the display device 120 includes a bird's eye view of the area around the vehicle 100. View 252 is a virtual top-down front view (which is a view synthesized from the images from the cameras 102 and 104), and view 254 is a virtual top-down rear view (which may be useful if the vehicle is maneuvering forward and backward during parking). A depiction of the vehicle 100 is provided between the view 252 and the view 254 for reference. Side views 256 can be constructed from images from side view cameras if available, or can be constructed using temporal filling techniques (discussed below) from front and rear camera images. As can easily be envisioned, many different combinations of views can be defined as display modes, which are selected as discussed in detail above.

When the front bumper of the vehicle 100 is within two feet or so of a curb, many drivers may find a top-down front view to be most helpful. In fact, during forward parking maneuvers, many drivers may prefer a display mode where an enhanced top-down front view occupies the full screen of the display device 120. Techniques for processing digital images are known in the art—including constructing virtual image views, and de-warping images from wide-angle or fish-eye lenses to remove the distortion. However, creation of a virtual top-down view from wide-angle lenses which are aimed more nearly horizontal than vertical creates a set of challenges which until now have not been solved.

Figure 10:
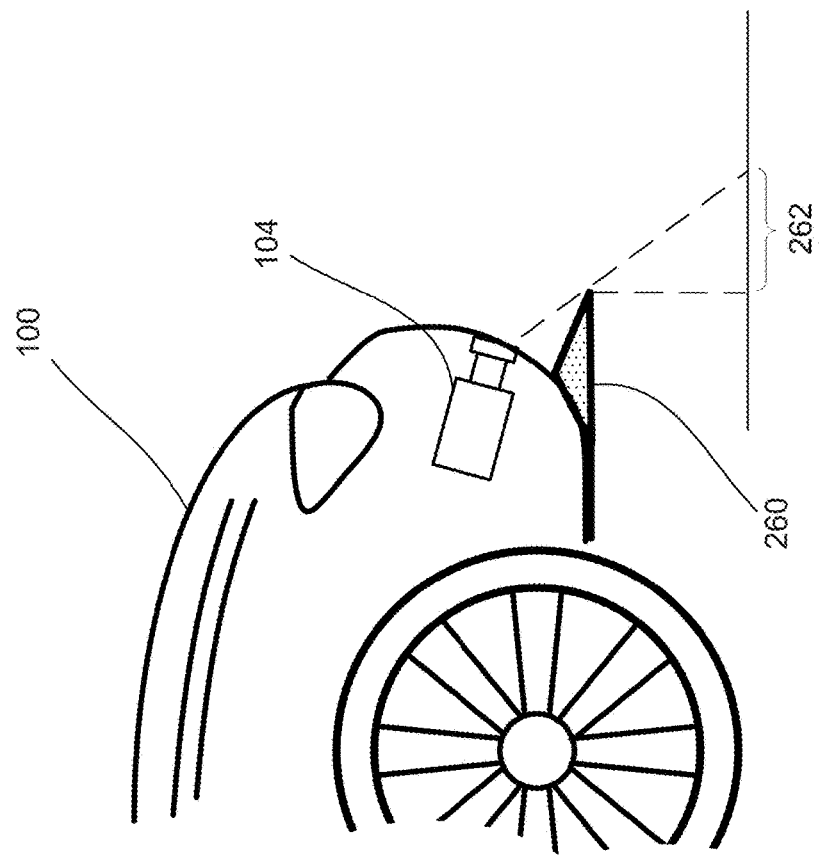
FIG. 10 is an illustration of how vehicle body parts in the bumper/fascia area can create an artificial protrusion effect in a virtual top-down view.

Three types of problems have been identified which are associated with virtual top-down views synthesized from images from the cameras 102 and 104. These three classes of problems, the solutions of which are discussed in detail below, are as follows;

1) Body part artifacts in de-warped image
2) Low resolution and/or noise around boundaries of de-warped image
3) "Double vision" effect in surfaces and objects above ground level FIG. 10 is an illustration of how vehicle body parts in the bumper/fascia area can create an artificial protrusion effect in a virtual top-down view. In FIG. 10, it can be seen that the camera 104 is mounted so that the lens is very nearly flush with the face of the bumper of the vehicle 100. However, many vehicles include protrusions from the lower front bumper or fascia. These protrusions, such as the protrusion 260, extend forward of the lens of the camera 104 and obstruct the view of the ground from the camera 104. Thus, in a virtual top-down view, the protrusion 260 will appear to be farther forward and larger than it would be in a true top-down view. The difference between the apparent size/position of the protrusion 260 and the true size/position in a top-down view is represented by a distance 262. The distance 262 is a function of the geometry of the camera, the protrusion 260, and the distance 130 above ground, and can be compensated for.

Figure 11:
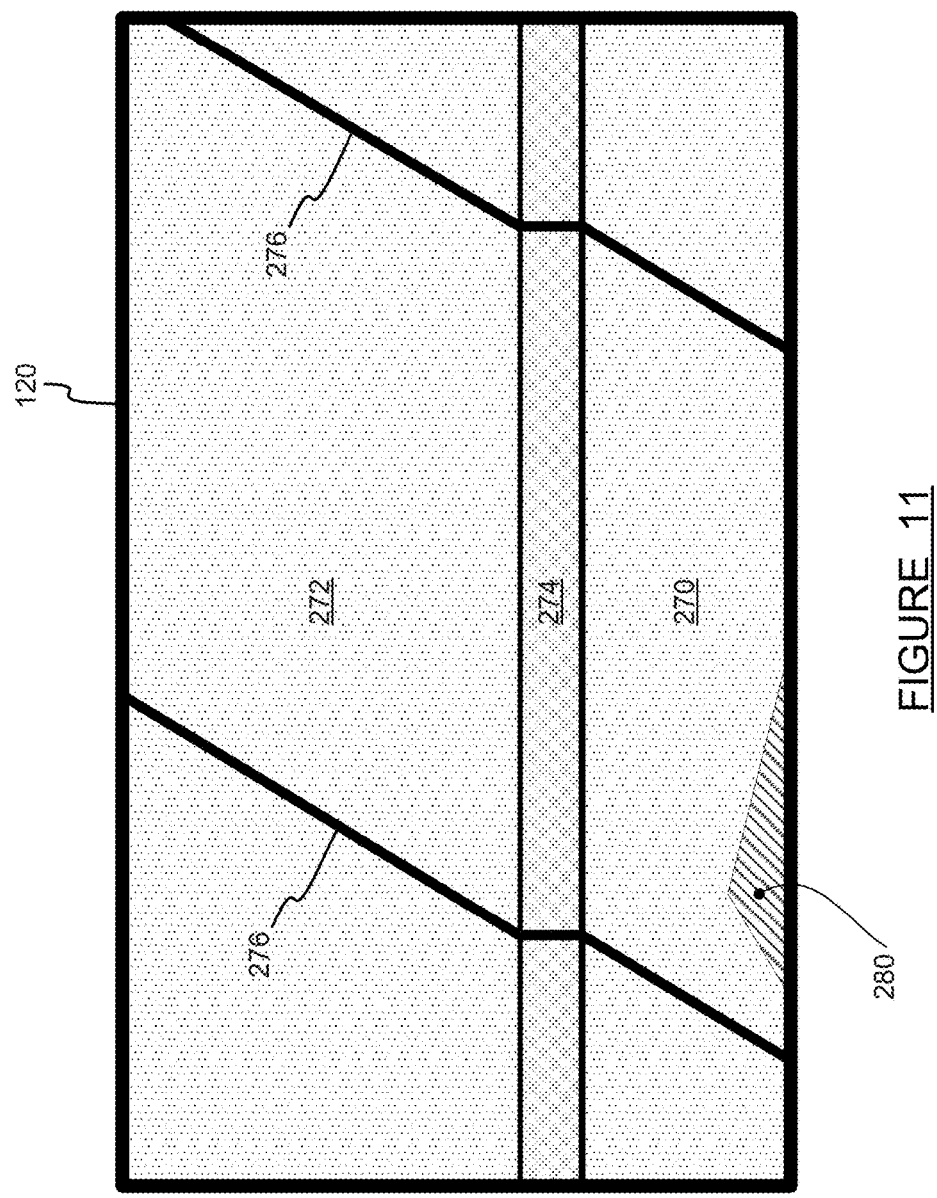
FIG. 11 is an illustration of a virtual top-down view in which the protrusion shown in FIG. 10 artificially extends forward as a result of camera/vehicle geometry and image de-warping, creating an occlusion region.

FIG. 11 is an illustration of a virtual top-down view in which the protrusion 260 artificially extends forward as a result of camera/vehicle geometry and image de-warping, creating an occlusion region 280. The virtual top-down view, shown as being displayed on the display device 120, depicts a horizontal parking lot surface 270, a horizontal walkway surface 272 which is raised some height above the surface 270, and a vertical face 274 which acts as a curb. This configuration of a parking lot surface and a raised curb/walkway is common in many commercial and retail parking lots. Joints 276 represent joints in the concrete sections of the walkway surface 272, where the joints 276 become vertical on the vertical face 274, and the joints 276 may extend for some distance into the parking lot surface 270.

Figure 12:
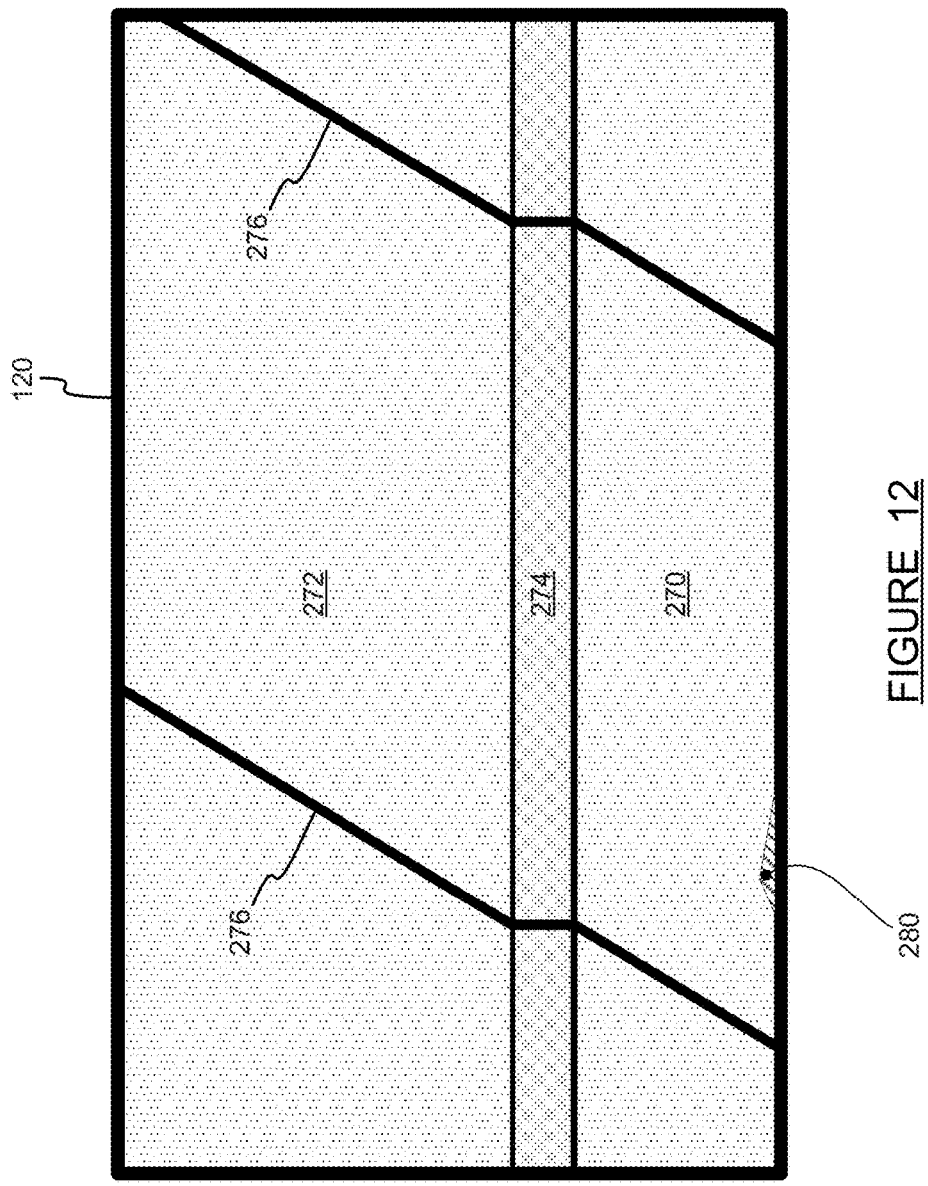
FIG. 12 is an illustration of a virtual top-down view in which the occlusion region has been re-textured through image manipulation.

In the virtual top-down view on the display device 120, the bottom edge represents the true front of the vehicle 100. Thus, as the vehicle 100 is slowly driven forward, the driver can see when an obstacle is reached. As discussed above, the appearance that the protrusion 260 extends significantly forward is artificial, with the occlusion region 280 being an artifact of image de-warping and the natural geometric relationships of the camera lens and the protrusion 260 relative to each other and to ground. Techniques have been developed which allow the occlusion region 280 to be modified so that the protrusion 260 appears in its true position in a synthesized virtual top-down view, and the occlusion region 280 is synthetically textured to appear as the surrounding ground. FIG. 12 is an illustration of a virtual top-down view in which the size of the occlusion region 280 has been significantly reduced to reflect the true position of the protrusion 260, and most of the area which was originally included in the occlusion region 280 has been re-textured through image manipulation.

Figure 13:
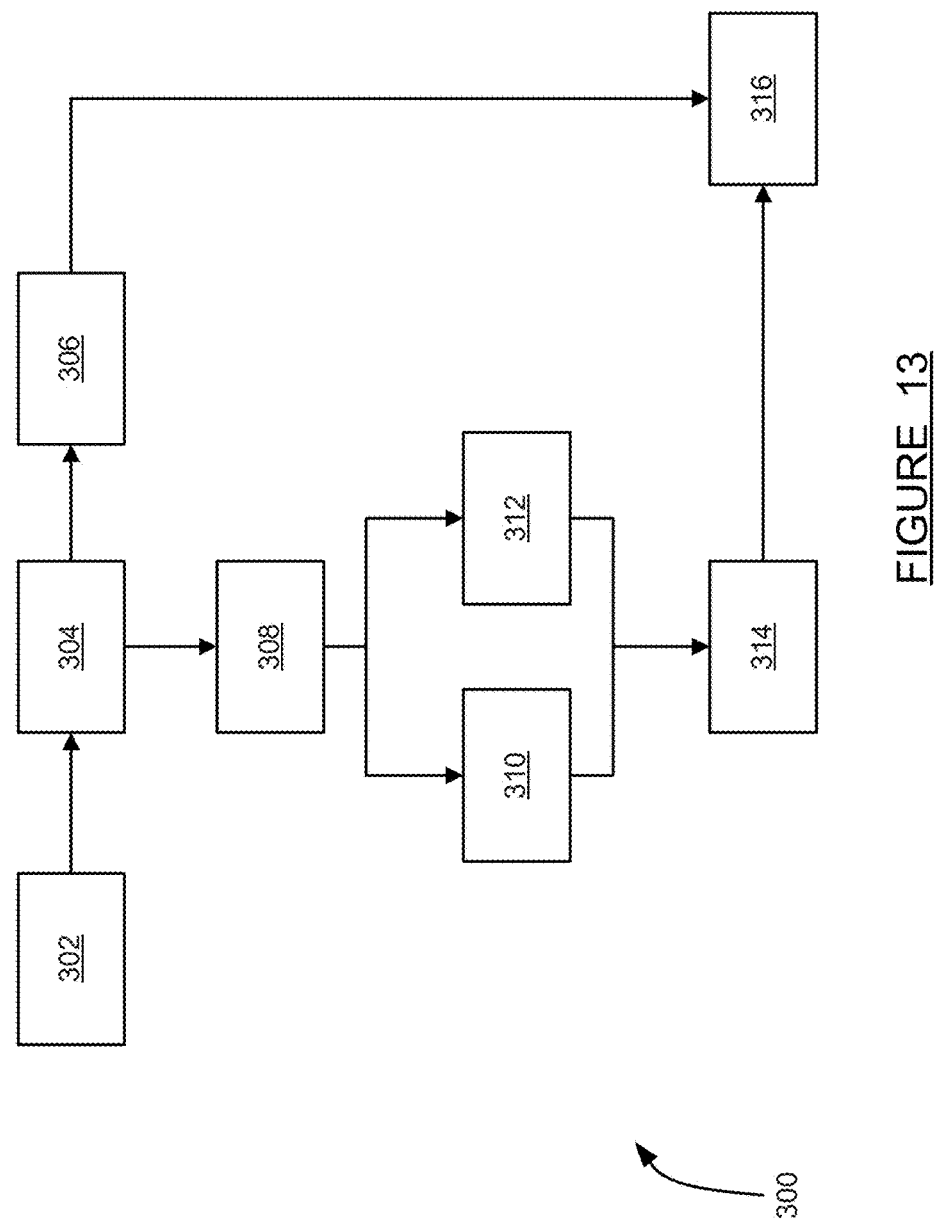
FIG. 13 is a flowchart diagram of a method for eliminating artificial vehicle body part appearance in a virtual top-down view constructed from vehicle frontal camera images.

FIG. 13 is a flowchart diagram 300 of a method for eliminating artificial vehicle body part appearance in a virtual top-down view constructed from vehicle frontal camera images. Creation of the enhanced virtual top-down view shown in FIG. 12 begins at box 302 by quantifying the geometric relationships discussed above and shown in FIG. 10. These three-dimensional relationships are known, unchanging vehicle design quantities for any particular vehicle model. It therefore becomes a fairly simple calculation to determine exactly which pixels of a camera image will be occluded by the protrusion 260. It is also possible to compare a true top-down view of the front of the vehicle 100 with the virtual top-down view shown in FIG. 11, and manually identify the pixels which are artificially occluded by the protrusion 260.

At box 304, a de-warping calculation is performed, to account for the distortion of the image when the naturally warped image from the wide-angle lens of the cameras 102 and 104 is flattened or "de-warped" to make straight lines appear straight. Image de-warping calculations are known in the art. At box 306, a set of pixels which are artificially masked by the vehicle body protrusion 260 are provided. The pixels from the box 306, which are the occlusion region 280 of FIG. 11, will need to be re-textured to appear as ground surface.

At box 308, the same pixels in the occlusion region 280 are analyzed for re-texturing. Two techniques can be used for the filling and re-texturing of the pixels in the occlusion region 280. At box 310, a spatial filling is performed. The spatial filling at the box 310 includes identifying texture (such as the grainy gray appearance of weathered concrete) and structure (such as the joint 276) near the occlusion region 280, and filling in the occlusion region 280 based on the surrounding texture and structure. The spatial filling technique from the box 310 can be very effective when the occlusion region 280 is fairly small, and/or the texture of the parking lot surface 270 is fairly consistent.

At box 312, a temporal filling is performed. The temporal filling at the box 312 involves using actual image pixels of the parking lot surface 270, obtained when those pixels were just outside the occlusion region 280, and transposing the pixels into the occlusion region 280 based on vehicle motion. Vehicle motion for the temporal filling can be determined from optical flow or from vehicle dynamics sensors, where optical flow involves following the motion of feature points as subsequent images are obtained. Using vehicle motion, which is typically slow and steady during a parking maneuver, pixels representing the actual part of the parking lot surface 270 which is within the occlusion region 280 can be copied from previous images into subsequent images of the virtual top-down view.

At box 314, the occlusion region 280 is filled and re-textured using a combination of the spatial filling technique from the box 310 and the temporal filling technique from the box 312. At box 316, an enhanced virtual top-down view is created in which the body mask region from the box 306 is in-filled with surrounding background texture from the box 314, so that only the true shape of the protrusion 260 remains in the view. As can be seen in FIG. 12, the appearance of the protrusion 260 is reduced by using the filled and re-textured occlusion region 280.

Figure 14:
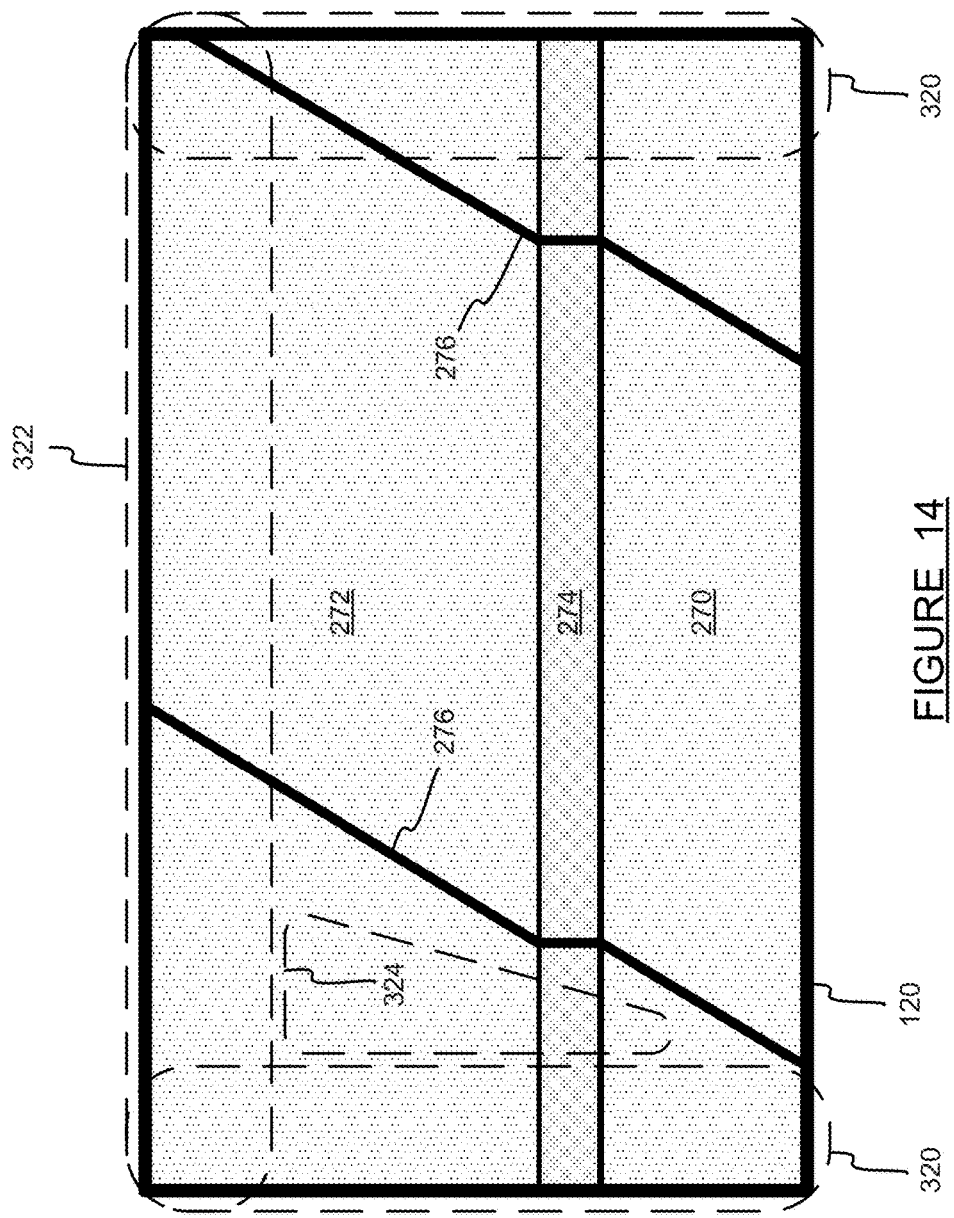
FIG. 14 is an illustration of a virtual top-down view in which the certain portions of the view exhibit low resolution and/or image noise.

The second type of problem associated with virtual top-down views synthesized from left- and right-front camera images is low resolution and/or noise around boundaries of de-warped image. FIG. 14 is an illustration of a virtual top-down view in which the certain portions of the view can exhibit low resolution and/or image noise. The virtual top-down view of FIG. 14, like FIGS. 11 and 12, depicts the horizontal parking lot surface 270, the horizontal walkway surface 272 which is raised some height above the surface 270, the vertical face 274 which acts as a curb, and the joints 276 in the concrete sections of the walkway surface 272.

As discussed above, it is necessary to "de-warp" images from wide-angle lenses in order to remove distortion and create a realistic looking top-down view. When de-warping images, resolution is inherently lost in peripheral or edge regions of the virtual view, as each pixel in these regions is magnified to occupy more of the image. Left and right peripheral regions 320 and upper peripheral region 322 as shown in FIG. 14 represent the low-resolution regions of the virtual top-down view. Image/video noise in the image is also a problem in the regions 320 and 322, as a small light or dark speck could be magnified to appear much larger than it really is. Of course, the boundaries of the low-resolution regions are not perfectly straight as shown in FIG. 14—but the regions 320 and 322 are illustrative of the concept. There is no low-resolution region in the lower part of the image, as this edge is nearest the cameras 102 and 104, and the pixels in this part of the image do not need to be significantly magnified in the de-warping process.

Figure 15:
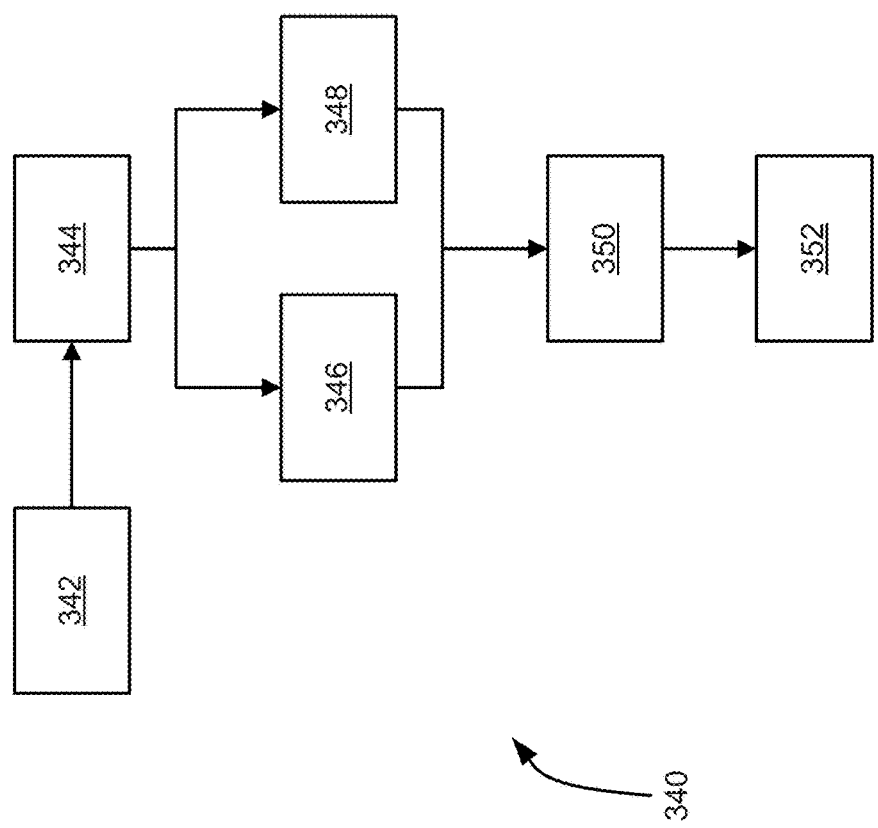
FIG. 15 is a flowchart diagram of a method for eliminating low resolution and image noise in edge regions of a virtual top-down view constructed from vehicle frontal camera images.

FIG. 15 is a flowchart diagram 340 of a method for eliminating low resolution and image noise in edge regions of a virtual top-down view constructed from vehicle frontal camera images. At box 342, a de-warping calculation is performed on the virtual top-down view, to account for the distortion of the image when the naturally warped image from the wide-angle lens of the cameras 102 and 104 is flattened to make straight lines appear straight. At box 344, a set of pixels which are artificially low in resolution are provided. These pixels represent the edge regions 320 and 322, where the low resolution and noise are the result of pixel magnification in the de-warping process.

Two techniques can be used for the filling and re-texturing of the pixels in the low resolution regions 320 and 322. At box 346, a spatial resolution enhancement and de-noise calculation is performed. The spatial enhancement at the box 346 includes identifying both color and intensity channels in the low-resolution regions 320 and 322, and using the native colors and intensities in a smoothing calculation which preserves edges such as the edges of the vertical face 274. The spatial filling at the box 346 also includes borrowing texture from neighboring full-resolution areas, such as region 324 which can be used for the left-side low-resolution region 320 and the left portion of the upper low-resolution region 322. Using the surface texture from the neighboring full-resolution region 324, and color and intensity patterns from the low-resolution regions 320 and 322 themselves, the spatial resolution enhancement and de-noise calculation at the box 346 can significantly restore image quality around the edges of the virtual top-down view.

At box 348, a temporal resolution enhancement and de-noise calculation is performed. The temporal enhancement at the box 348 involves using actual image pixels of the surface 270, 272 and 274, obtained when those pixels were just outside the low-resolution regions 320 and 322, and transposing the pixels into the low-resolution regions 320 and 322 based on vehicle motion. As discussed previously, vehicle motion for the temporal enhancement can be determined from optical flow or from vehicle dynamics sensors, where optical flow involves following the motion of feature points as subsequent images are obtained. Vehicle motion tends to work against temporal enhancement of the region 322 in particular, as pixels in that region will not have previously been in a high-resolution region of the image if the vehicle 100 has been moving only forward. However, temporal enhancement may be helpful for the left and right low-resolution regions 320, particularly if the vehicle 100 is turning while maneuvering to park. Using vehicle motion, pixels representing actual parts of the surfaces 270-274 which are within the low-resolution regions 320 can be copied from previous images into subsequent images of the virtual top-down view at the box 348.

At box 350, the low-resolution regions 320 and 322 are redefined using a combination of results of the spatial enhancement technique from the box 346 and the temporal enhancement technique from the box 348. At box 352, an enhanced virtual top-down view is created in which the original pixels from the low-resolution regions 320 and 322 are replaced with the redefined pixels from the box 350, and combined with the remainder of the de-warped image from the box 342.

Figure 17:
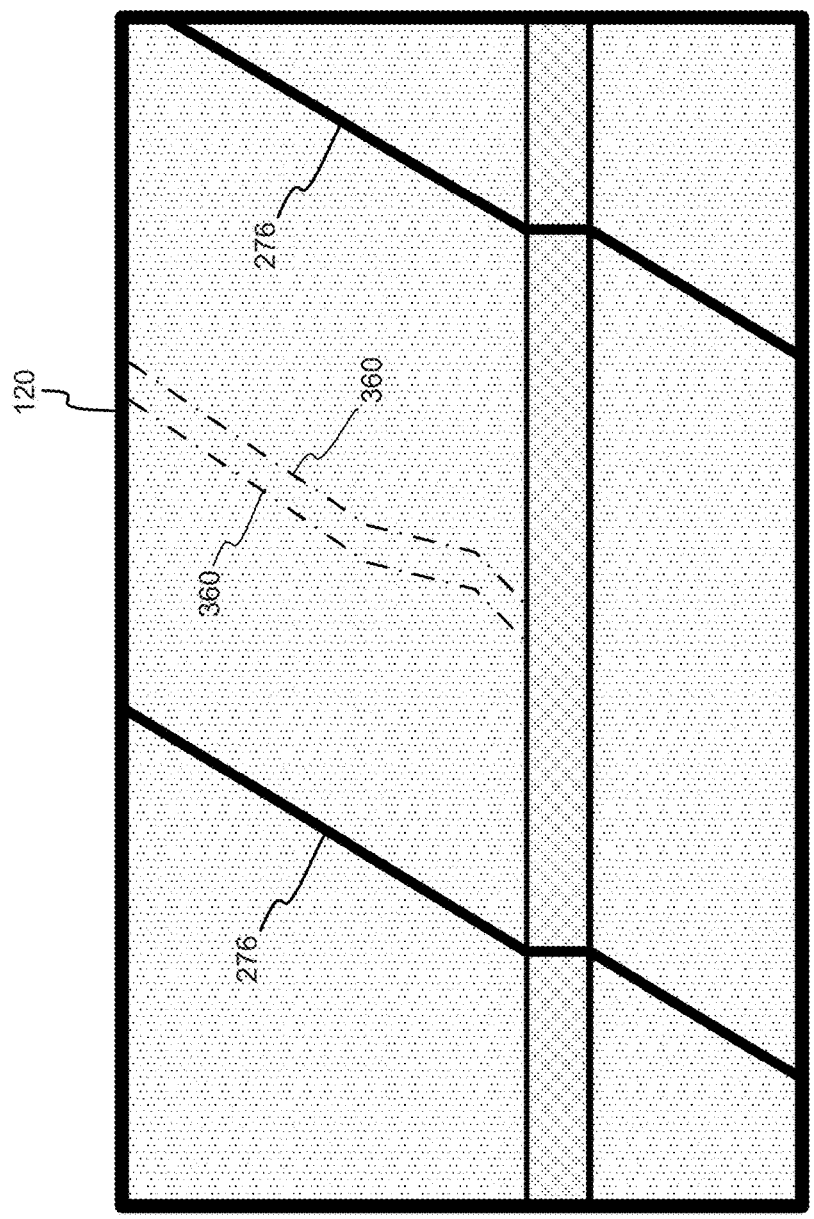
FIG. 17 is an illustration of how some parts of the virtual top-down view can appear to have "double vision" when left and right camera images are merged.

The third type of problem associated with virtual top-down views synthesized from left- and right-front camera images is a "double vision" effect in objects which protrude above ground level. FIGS. 16A and 16B are illustrations of virtual top-down views from the left front camera 102 and the right front camera 104, respectively, and FIG. 17 is an illustration of how some parts of the virtual top-down view can appear to have "double vision" when left and right camera images are joined. In the FIGS. 16 and 17, the surfaces 270, 272 and 274 appear as in previous figures, as do the joints 276 (there are two different joints 276—one to the left, and one to the right—as shown in FIGS. 11, 12 and 14). In FIGS. 16A and 16B, a crack 360 can be seen in the walkway surface 272. The crack 360 appears toward the right side of the left camera image in FIG. 16A, and the crack 360 appears toward the left side of the right camera image in FIG. 16B.

In FIG. 17, the crack 360 appears twice, even though there is only one crack 360 in the walkway surface 272. This "double vision" effect is a result of the left and right image combination being based on calculations which assume everything in the image is at the same ground level. Objects or obstacles which extend above ground level (which is at the lower edge of the image, that being the portion of the image nearest the cameras 102 and 104, and is known to be the distance 130 below the cameras) can appear out of position in the de-warped and combined virtual top-down view. However, this double vision effect can be corrected in the enhanced virtual top-down view, via the calculations discussed below.

Figure 18:
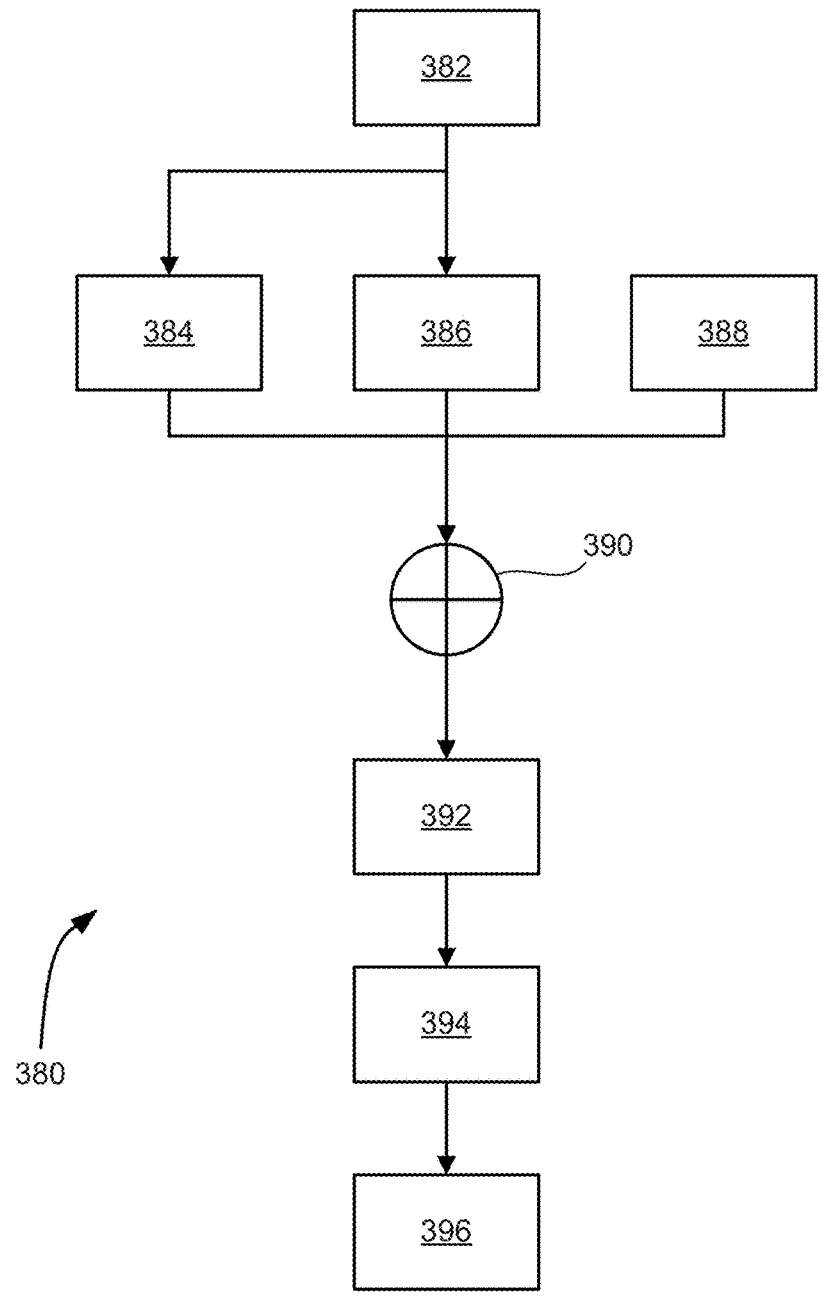
FIG. 18 is a flowchart diagram of a first method for eliminating the double vision effect for above-ground obstacles in a virtual top-down view constructed from vehicle frontal camera images.

FIG. 18 is a flowchart diagram 380 of a first method for eliminating the double vision effect for above-ground obstacles in a virtual top-down view constructed from vehicle frontal camera images. At box 382, a de-warping calculation is performed on the virtual top-down view constructed from left- and right-front camera images, to account for the distortion when the naturally warped images from the wide-angle lens of the cameras 102 and 104 is flattened to make straight lines appear straight. At box 384, curbs and raised walkways are detected in the constructed virtual top-down view. As discussed previously, these parking space boundaries can be detected by analyzing a sequence of images during vehicle motion, looking for straight lines and other visual indicators of curbs and raised walkways.

At box 386, above-ground obstacles are detected in the images from the cameras 102 and 104 using stereo vision and/or structure from motion techniques. Structure from motion (SFM) refers to the process of estimating three-dimensional structures from two-dimensional image sequences which may be coupled with local motion signals. The stereo vision and SFM analysis provides information about the size, shape and location of above-ground obstacles in the forward path of the vehicle 100. At box 388, other sensors onboard the vehicle 100 provide object detection signals for the area ahead of the vehicle 100. The other onboard sensors may include—but are not limited to— ultrasonic, short-range radar and LIDAR, for example.

At junction 390, the frontal obstacles identified in the boxes 384-388 are scaled and combined, to allow all of the data to be used to define an object map in the area ahead of the vehicle 100. At box 392, a complete model of the three dimensional objects—including curbs, raised walkway, posts, etc.—in front of the vehicle 100 is assembled from the data from the boxes 384-388. The model of the three dimensional objects includes the location, size and shape of the objects. Where curbs and raised walkways are present, it is extremely valuable to be able to determine the height of these objects, for at least two reasons. First, if a curb or raised walkway has a height of six inches above the parking lot surface, and the vehicle 100 only has a front air dam ground clearance of five inches, warnings can be given to the driver to indicate that the vehicle 100 should be stopped before the front bumper reaches the curb or raised walkway (as opposed to driving forward until the front tires bump to a stop). Second, knowing the height of the raised walkway 272 above the parking lot surface 270 allows for a calculation to be made which eliminates the double image of the crack 360 as seen in FIG. 17.

At box 394, images of curbs or other above-ground obstacles are rendered, using the 3D model of objects from the box 392 and the original de-warped image data from the box 382. By knowing the location, size and shape of any above-ground obstacles ahead of the vehicle 100, the left- and right-front camera images can be reliably combined without displaying duplicate copies of the obstacles. For example, consider a situation where a post is present in front of the vehicle 100, to the left of center. If the left- and right-front camera images were simply de-warped and combined, there would appear to be two such posts, each with a different apparent distance and location, in the combined image. However, with the knowledge from the 3D object model that there is only one such post, and the knowledge of the actual location of the post, the left- and right-front camera images can be processed such that the post correctly appears only once. This same sort of image processing can be used to correctly render any above-ground feature, including the crack 360 of FIG. 17, which will appear only once.

Finally, at box 396, the refined virtual top-down view is synthesized, including the above-ground obstacle renderings from the box 394. The refined virtual top-down view does not include false double-images of above-ground items like the crack 360, and the refined view also improves the visual rendering of 3D objects based on their actual size, shape and location as modeled using all available data sources.

Figure 19:
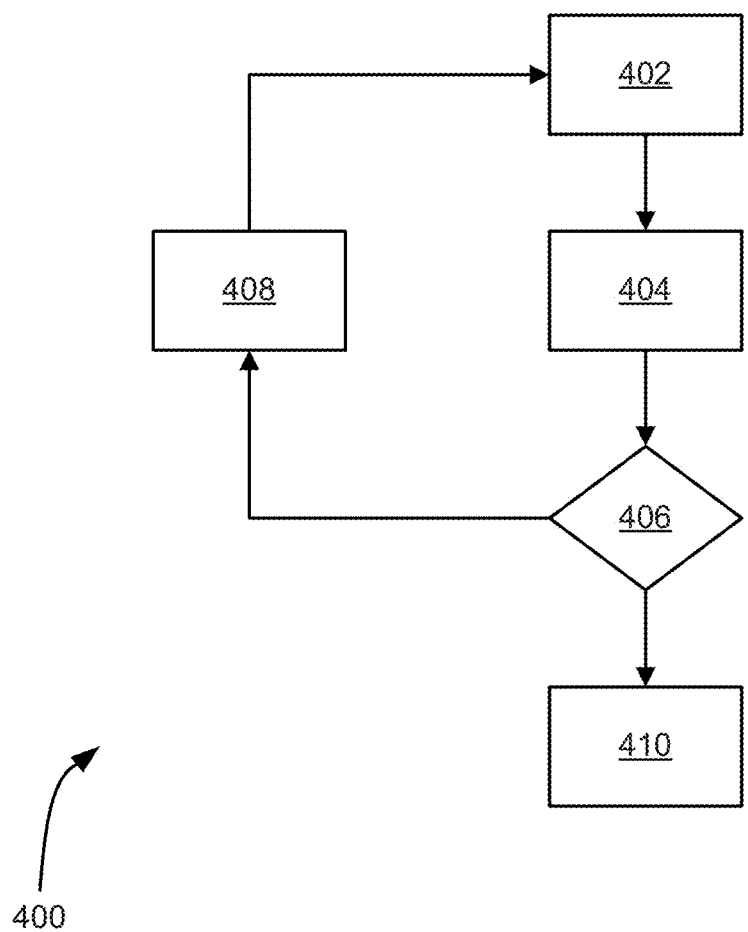
FIG. 19 is a flowchart diagram of a second method for eliminating the double vision effect for above-ground obstacles in a virtual top-down view constructed from vehicle frontal camera images.

FIG. 19 is a flowchart diagram 400 of a second method for eliminating the double vision effect for above-ground objects in a virtual top-down view constructed from vehicle frontal camera images. At box 402, a de-warping calculation is performed on the virtual top-down view constructed from left- and right-front camera images, to account for the distortion when the naturally warped images from the wide-angle lens of the cameras 102 and 104 is flattened to make straight lines appear straight. At box 404, the de-warped image is analyzed to detect any double image effect in texture or structure. For example, image analysis techniques are known which could readily recognize that the crack 360, which appears twice in FIG. 17, is really the same object.

If double image effects are found at the box 404, then at decision diamond 406 the process loops back to box 408 where an above-ground height of the double-imaged structure is estimated based on the lateral distance between the duplicate images. The process then returns to the box 402 where the de-warp calculation is performed again, using a revised assumption about above-ground height for the portion of the field of view containing the double-imaged structure. The revised assumption about above-ground height will modify the de-warp calculations, causing a lateral shift of objects in that portion of the field of view.

The image is then re-analyzed at the box 404 and, if necessary, the height assumption is further revised. This continues until the double image effect is eliminated and, at the decision diamond 406, the process moves to box 410 where the final refined virtual top-down view is output.

Other, simpler methods of eliminating the "double vision" effect in objects which protrude above ground level, as shown in FIGS. 16 and 17, are also possible. In one such simpler method, rather than iteratively estimating curb height as in the method of FIG. 19 discussed above, a set of standard curb heights (such as 5, 6, 7 and 8 inches) can be assumed, and the image transformation mapping for each of these heights can be pre-calculated. Then, when a double-imaging effect is detected in a merged image, the image transformation calculation can quickly be re-run for all of the standard curb heights, and the results can be analyzed to determine which curb height transformation did the best job of eliminating the double-imaging effect. This method avoids the iterative calculations discussed previously and directly provides a final image with minimal double-image effects, while also providing an estimate of curb height which could be used in other vehicle systems.

Yet another method of eliminating the "double vision" effect in objects which protrude above ground level is to simply compare the left and right images, find common feature points in the overlap area of the images, and use image registration to transform the images so that the common features points line up in the overlap area when the images are merged. This method does not provide an estimate of curb height, but may be the simplest to perform computationally, and still provides a final image with minimal double-image effects.

Figure 20:
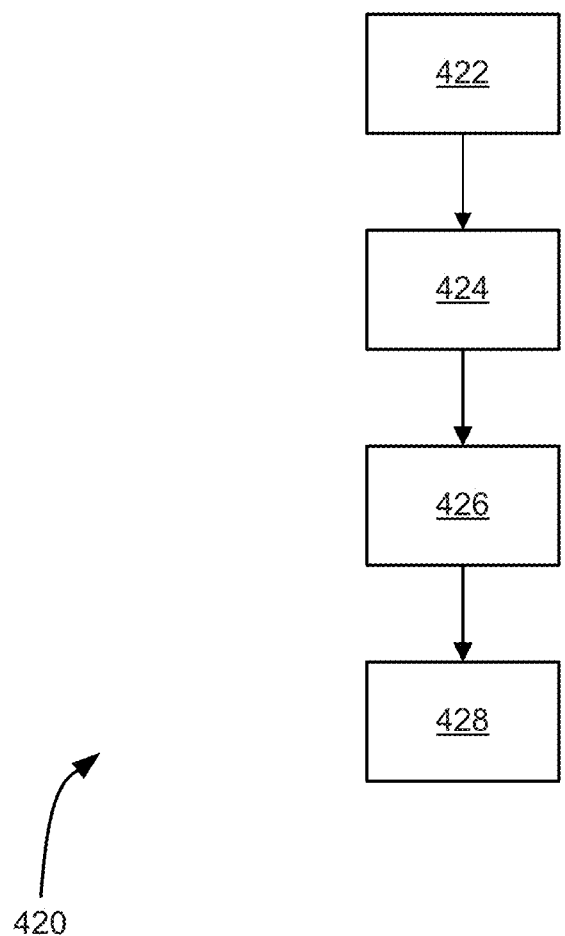
FIG. 20 is a flowchart diagram of a method for creating an enhanced virtual top-down view constructed from vehicle frontal camera images.

FIG. 20 is a flowchart diagram 420 of a method for creating an enhanced virtual top-down view constructed from vehicle frontal camera images. At box 422, a de-warping calculation is performed on the virtual top-down view constructed from left- and right-front camera images, to account for the distortion when the naturally warped images from the wide-angle lens of the cameras 102 and 104 is flattened to make straight lines appear straight. At box 424, artificially exaggerated vehicle body part artifacts are removed from the de-warped image, using the methods of the flowchart diagram 300 shown in FIG. 13. At box 426, low resolution and image/video noise around edges of the de-warped image are corrected, using the methods of the flowchart diagram 340 shown in FIG. 15. At box 428, the "double vision" effect in surfaces or objects above ground level is corrected, using one of the methods shown in FIG. 18 or FIG. 19 or one of the simpler methods subsequently described. The result of the image enhancements from the boxes 424-428 is a virtual top-down view which is significantly more realistic in appearance than an ordinary de-warped image.

Using the techniques described above, three problems which are typically associated with virtual top-down views synthesized from multiple camera images can be solved, resulting in a very realistic virtual top-down front curb view. In prototype system tests, the enhanced virtual top-down view has been demonstrated to be extremely helpful to drivers maneuvering near curbs and other frontal obstacles. The virtual top-down view synthesis techniques discussed above in the context of a front view are also applicable to virtual top-down views to the rear and to the sides of the vehicle 100, if camera images are available. The techniques can also be used with more than two cameras per virtual view. If more than two cameras are available to construct a virtual top-down front view, for example, the resultant view quality will improve because more image pixels will be used as input and image de-warping effects can be reduced.

As discussed above, a forward perspective view may be selected as the largest view on the display device 120, as drivers are typically comfortable looking at a perspective view. Techniques for processing digital images are known in the art—including de-warping images from wide-angle lenses to remove the distortion which creates a fish-eye effect where objects in the front center of the image are artificially magnified and objects toward the periphery of the image are diminished and slanted away from center. However, traditional de-warping techniques and camera models can create other problems in the processed images.

Figure 21:
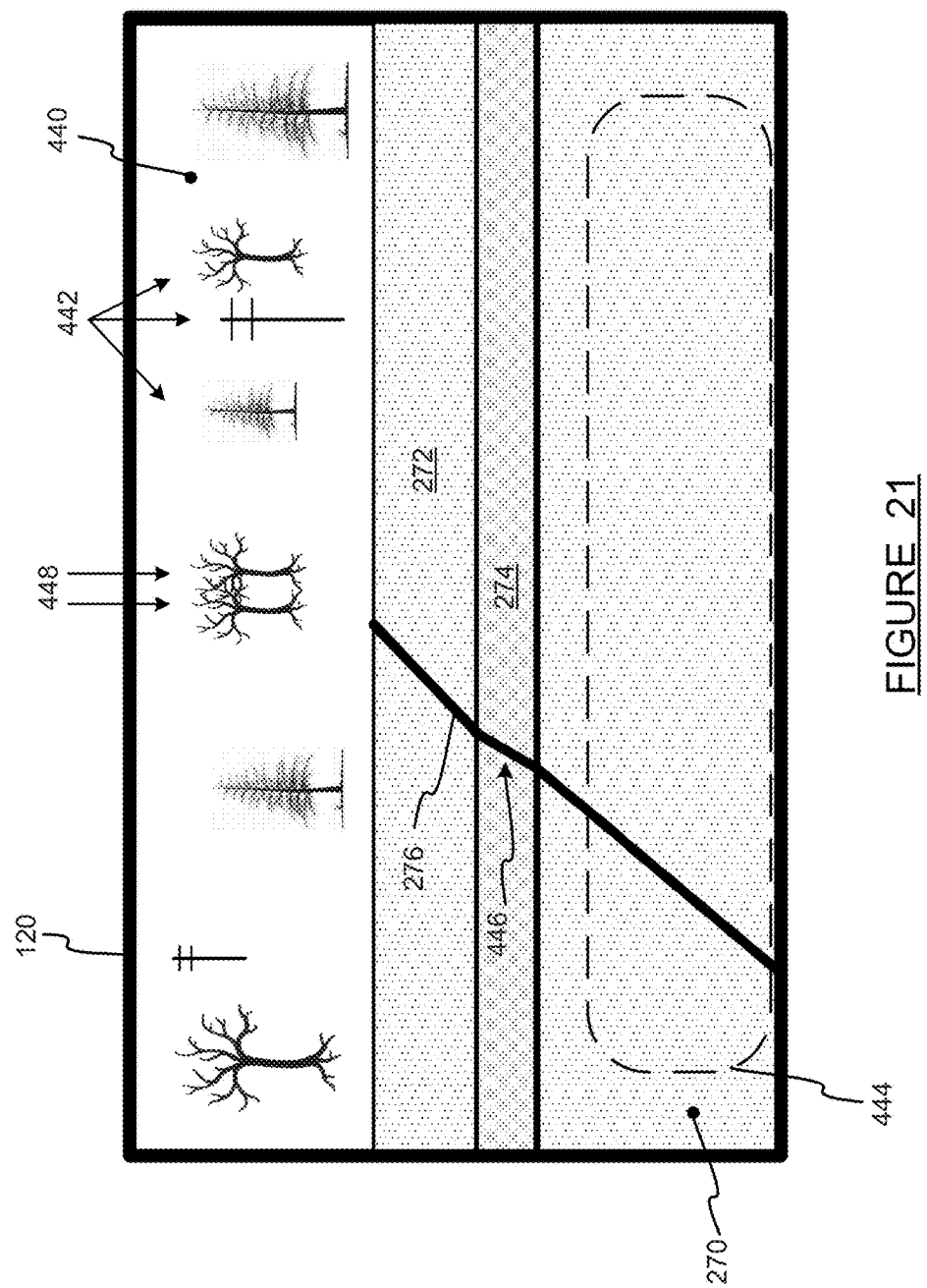
FIG. 21 is an illustration of a perspective view in front of a vehicle which includes distortions inherent in images from wide-angle lenses which have been processed using traditional de-warping techniques.

FIG. 21 is an illustration of a perspective view in front of the vehicle 100 which includes distortions created by traditional de-warping techniques. FIG. 21 is a perspective view of essentially the same scene shown in previous figures—including the horizontal parking lot surface 270, the horizontal walkway surface 272 which is raised some height above the surface 270, the vertical face 274 which acts as a curb, and the joint 276 in the concrete sections of the walkway surface 272. The perspective view also includes an above-horizon area 440, which includes background objects 442 such as trees and telephone poles.

Two main types of problems have been identified which are associated with virtual perspective views synthesized from images from the cameras 102 and 104 when processed with traditional camera models. These two classes of problems, the solutions of which are discussed in detail below, are as follows;

1) Stretching and low resolution effect at peripheral part of de-warped wide-angle image, because of the rectilinear projection of pinhole model.

2) "Double vision" effect in overlapped field of view region and missing objects in blind spot of merged images.

The first problem with perspective views which have been processed using traditional de-warping by rectilinear projection using a pinhole camera model—stretching and low resolution—is apparent in two places in FIG. 21. First, the image resolution is decreased in area 444 due to stretching. Second, vertical joint 446, which is the vertical portion of the joint 276, appears to be sloped rather than vertical. In addition, there can be an exaggerated appearance of body part protrusions, such as the protrusion 260 discussed previously, due to this stretching. These problems can all be addressed by using new camera image surface models.

Figure 22:
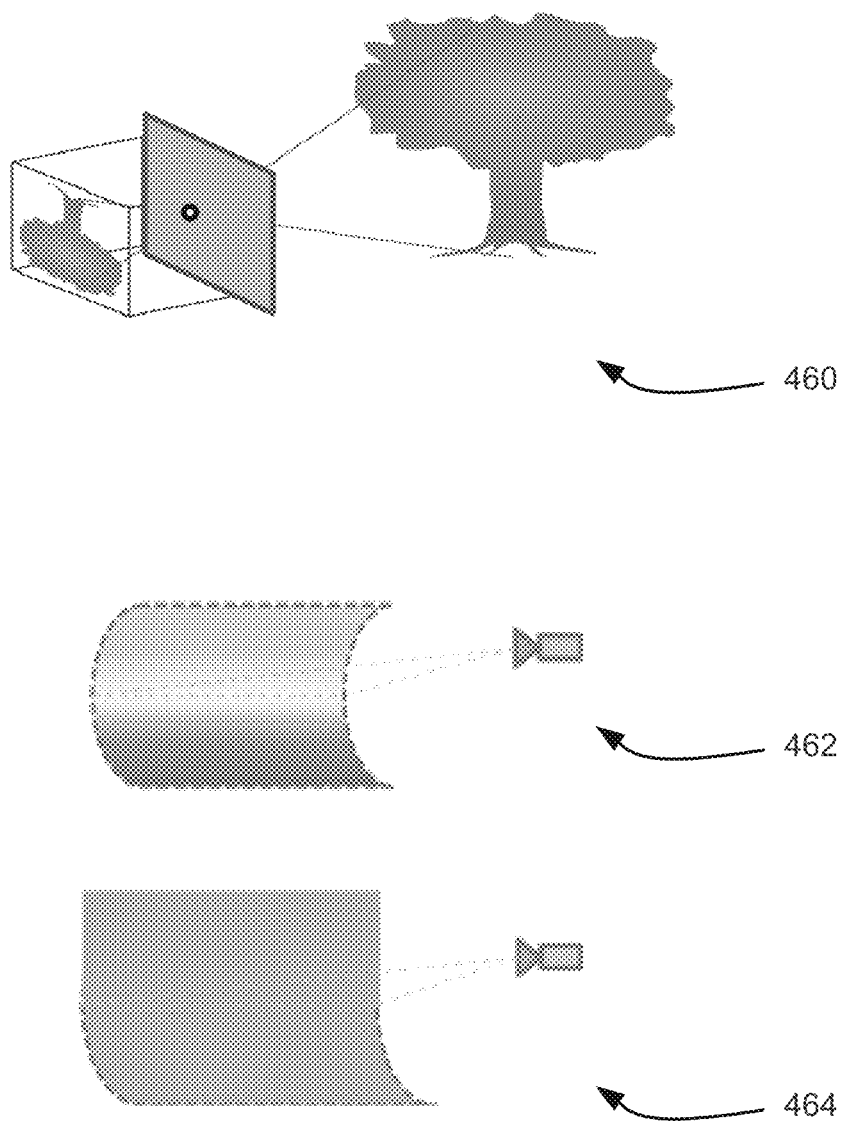
FIG. 22 is a diagram of camera image surface models which may be used to correct the distortions seen in FIG. 21.

FIG. 22 is a diagram of camera image surface models which may be used to correct the distortions seen in FIG. 21. A traditional pinhole camera model 460 is shown, in which light from a scene passes through a pinhole aperture and impinges on an imaging surface. In the traditional model 460, the imaging surface is a flat plane. This type of model results in the stretching effects in the peripheral area of the de-warped image shown in FIG. 21. In order to correct this stretching effect, an imaging surface 462 can be defined which is in the shape of a horizontal half-cylinder. Applying a model of the imaging surface 462 to the virtual perspective image of FIG. 21 can reduce the stretching effects in the below-horizon area. However, the cylindrical projection in the above-horizon area of the image can cause the background objects 442 to appear to tilt toward the center of the image. In order to avoid introducing this undesirable distortion effect, an imaging surface 464 can be defined, where the imaging surface 464 is in the shape of a horizontal quarter-cylinder for the below-horizon area of the image and is a flat planar shape for the above-horizon area of the image. A camera model including the imaging surface 464 has been shown to produce superior virtual perspective view image synthesis.

Camera models with imaging surfaces other than those shown on FIG. 22 can also be defined. For example, instead of a quarter-cylinder and a flat plane as in the surface 464, an image surface with a progressively changing radius of curvature could be defined. Also, image surface curvature effects from left to right could be introduced, along with the bottom to top curvature effects. Using various combinations such as these, compound image surfaces can be defined which produce both realistic and visually pleasing virtual perspective views.

The second problem with a merged perspective view constructed from left-front and right-front camera images is a "double vision" effect in an overlapped field of view region, as seen in the double appearance of tree 448 in FIG. 21. The overlap area being described is shown approximately as the overlap area 110 of FIG. 1. Blind spots—or areas not covered by either the left or right camera image—can also exist, resulting in missing objects or texture in the merged view. Other processing techniques, discussed below, can be applied to the virtual perspective view in order to correct discrepancies in the overlap area or blind spot between images from the camera 102 and the camera 104.

One technique which can be applied to the overlap area between left-front and right-front images is known as video morphing. In the video morphing technique, feature points are detected in the center overlap area of the images, and key points are registered. The left and right images are then morphed, meaning stretched or transformed, to cause the feature points to match up in the merged image. Previous image frames and vehicle motion information can be used to enhance image synthesis in the overlap area, where some objects move from a non-overlap area of the image to the overlap area. Using both the image morphing and the previous image frames, a temporal video morphing can be applied to the virtual perspective view which corrects both double-imaging and blank spots in the overlap area.

Another technique which can be applied to the overlap area between left-front and right-front images is image rendering based on 3D scene estimation. This technique is similar to the method described above in the flowchart diagram 380 of FIG. 18. As discussed above, this technique involves using stereo vision, structure from motion (SFM) and data from other onboard sensors to construct a 3D model of the scene in front of the vehicle 100. The 3D object scene can be correlated to the objects in the image, and the perspective view image can be re-rendered to eliminate the duplicate appearance of any objects, such as the tree 448.

Figure 23:
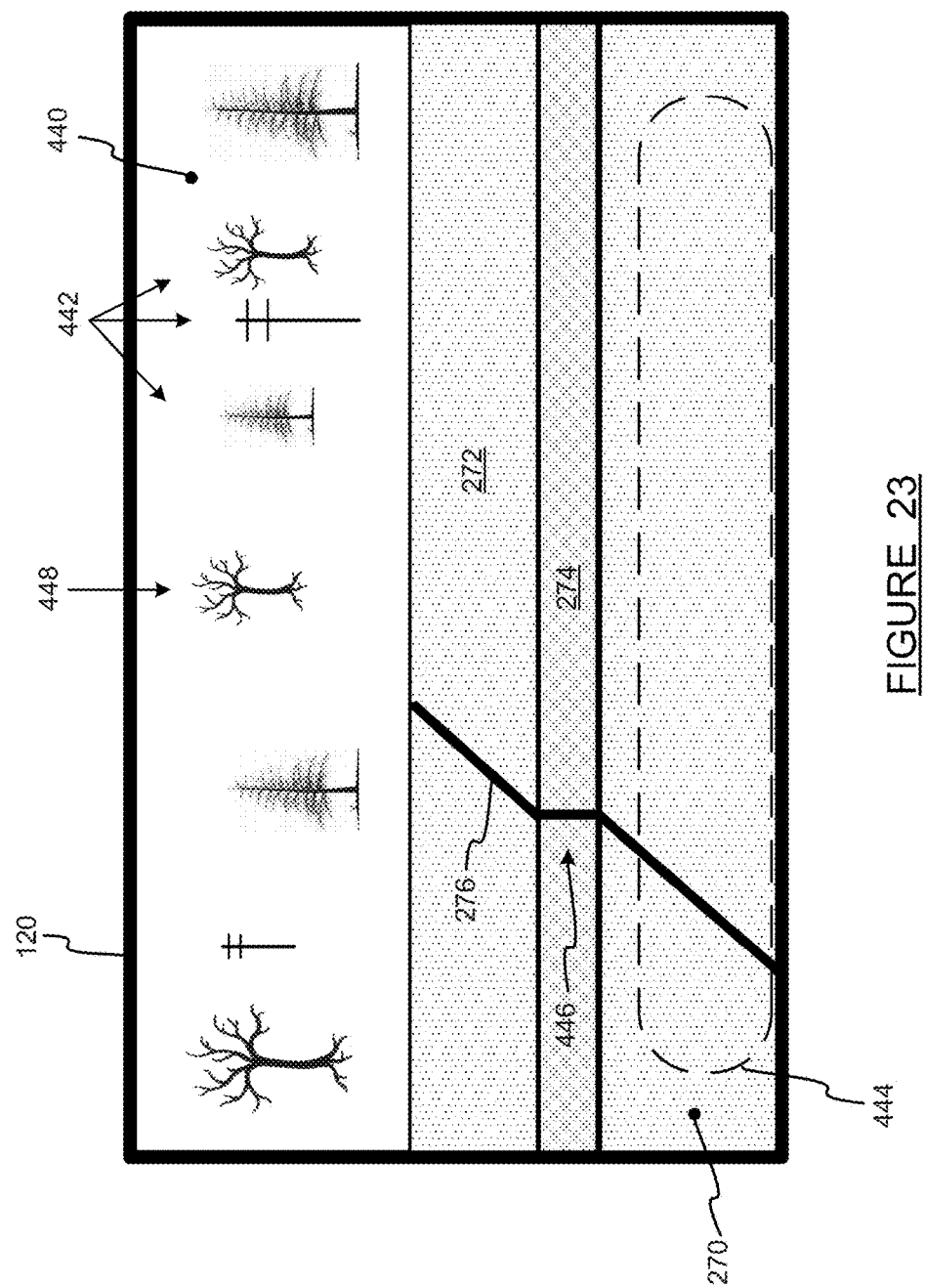
FIG. 23 is an illustration of a perspective view in front of a vehicle in which the distortions seen in FIG. 21 have been corrected by application of the new virtual image surface model of FIG. 22 and other processing techniques.

FIG. 23 is an illustration of a perspective view in front of the vehicle 100 in which the distortions seen in FIG. 21 have been corrected by application of the new virtual image surface model of FIG. 22, and the other techniques discussed above. It can be seen in FIG. 23 that the stretching effect in the area 444 is eliminated due to the application of the cylindrical camera image model in the below-horizon area. Thus, there is no loss of resolution in the area 444. It can also be seen in FIG. 23 that the vertical joint 446 appears vertical as it should, also due to the application of the cylindrical camera image model in the below-horizon area. Finally, the double image of the tree 448 is eliminated due to application of the overlap region correction techniques discussed above.

Figure 24:
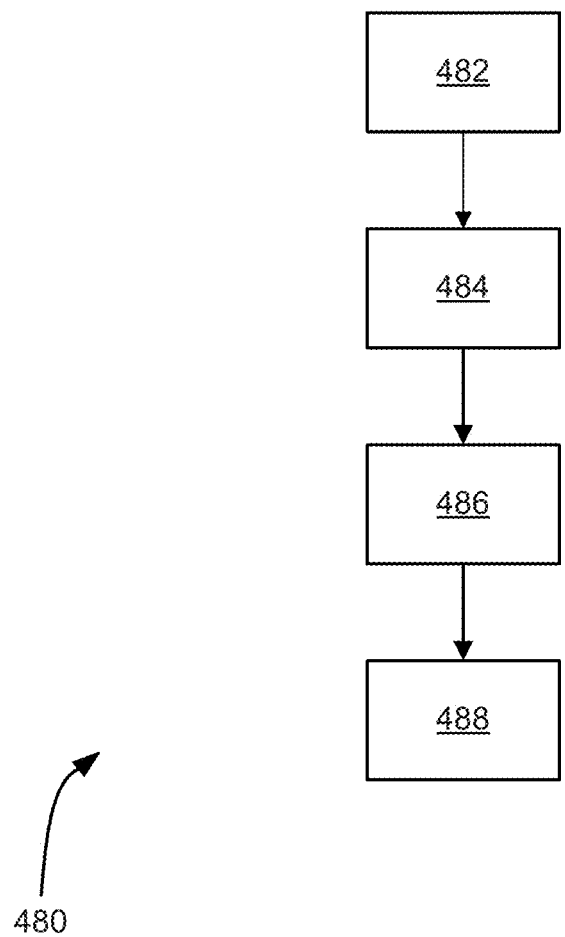
FIG. 24 is a flowchart diagram of a method for creating an enhanced perspective view constructed from vehicle frontal camera images using the camera image surface model of FIG. 22.

FIG. 24 is a flowchart diagram 480 of a method for creating an enhanced perspective view constructed from vehicle frontal camera images using the camera image surface model of FIG. 22 and other correction techniques. At box 482, a de-warping calculation is performed on the virtual perspective view constructed from left- and right-front camera images, to account for the distortion when the naturally warped images from the wide-angle lens of the cameras 102 and 104 is flattened to make straight lines appear straight. At box 484, the camera model image surface 464 is applied to the de-warped image, to correct stretching in the below-horizon part of the image while preserving the vertical appearance of vertical objects in the above-horizon part of the image. At box 486, the area where the left and right camera images overlaps is corrected to eliminate double-imaging of objects and blank spots. The corrections in the overlap area can include both video morphing and 3D scene estimation techniques, as discussed above. At box 488, a final virtual perspective view is provided, including the corrections discussed above, and as shown in FIG. 23.

Using the techniques described above, problems which are typically associated with virtual perspective views synthesized from wide-angle camera images using traditional camera models can be solved, resulting in a very realistic virtual front perspective view. The virtual perspective view synthesis techniques discussed above in the context of a front view are also applicable to virtual perspective views to the rear and to the sides of the vehicle 100, if camera images are available. The techniques can also be used with more than two cameras per virtual view. If more than two cameras are available to construct a virtual perspective front view, for example, the resultant view quality will improve because more image pixels will be used as input and image de-warping effects can be reduced.

Enhanced front curb viewing systems provide drivers with visual information which would otherwise be unavailable. Front curb views provide the driver with the assistance needed to accurately park their vehicle in proximity to curbs and other frontal obstacles, and the peace of mind of knowing that they are not going to accidentally bump into the obstacle and damage the vehicle. The automatic generation and display of these front curb views deliver value to the driver, resulting in increased customer satisfaction with the vehicle, and potentially avoiding expensive repair bills.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for providing enhanced images of an area in front of a vehicle, said system comprising:
    a first camera mounted at the left front of the vehicle;
    a second camera mounted at the right front of the vehicle;
    a video acquisition device in communication with the first and second cameras, said video acquisition device receiving raw images from the first and second cameras;
    a processor including a memory module, said processor being configured to determine whether to activate a front curb view display based on a detected frontal parking maneuver, said processor being further configured to determine what images to include in the front curb view display, and to provide the images including enhanced images synthesized from the raw images from the first and second cameras, where the processor includes a learning module configured to:
        (A) determine when to activate the front curb view display based on (1) preprogrammed learning based on parking view display preferences of a general population of drivers and (2) adaptive learning based on parking view display preferences of the driver of the vehicle; and
        (B) determine what views to include in the front curb view display based on (1) the preprogrammed learning based on the parking view display preferences of the general population of drivers and (2) the adaptive learning based on the parking view display preferences of the driver of the vehicle; and
    a display unit in a cockpit area of the vehicle for displaying the front curb view display from the processor for viewing by a driver of the vehicle.

2. The system of claim 1 further comprising a user input device for allowing the driver of the vehicle to signal that he or she wants to activate a front curb view display.

3. The system of claim 2 wherein the user input device is a microphone and the driver utters a spoken command to activate the front curb view display.

4. The system of claim 1 wherein the processor includes a heuristics module for detecting a frontal parking maneuver, said heuristics module including a vehicle state module for evaluating vehicle dynamic conditions, an object detection module for detecting a curb or parking space ahead of the vehicle, and a map module for determining from Global Positioning System data and digital map data that the vehicle is in a parking lot.

5. The system of claim 4 wherein the heuristics module is configured to activate the front curb view display when a vehicle speed is below a predetermined threshold and a curb or parking space is detected ahead of the vehicle.

6. The system of claim 4 wherein the vehicle state module detects vehicle speed, steering angle, yaw rate, longitudinal acceleration and lateral acceleration, and the vehicle state module determines when a parking maneuver is underway or possible.

7. The system of claim 4 wherein the object detection module uses image processing techniques to identify one or more parking spaces or structures ahead of the vehicle, and the parking spaces or structures are included in the front curb view display.

8. The system of claim 7 wherein the object detection module also uses signals from an object detection sensor to detect a curb or structure ahead of the vehicle, where the heuristics module is configured to activate the front curb view display when a vehicle speed is below a predetermined threshold and the curb or structure is detected ahead of the vehicle.

9. The system of claim 8 wherein the object detection sensor is selected from the group consisting of an ultrasonic sensor, a short-range radar sensor and a LIDAR sensor.

10. The system of claim 4 wherein the processor includes a mode selection module which is configured to select an optimal display mode in the front curb view display based on data from the heuristics module, where the optimal display mode includes one or more views in front of the vehicle which depict a parking space or structure toward which the vehicle is moving.

11. The system of claim 1 wherein the adaptive learning includes using driving history and Global Positioning System data to identify locations where the front curb view display was activated in the past.

12. The system of claim 11 wherein the adaptive learning also includes recognition of frequent destinations of the vehicle, where the frequent destinations include a home location, a work location and a school location.

13. The system of claim 1 wherein the front curb view display includes a top-down display which is synthesized from the raw images from the first and second cameras.

14. A system for providing enhanced images of an area in front of a vehicle, said system comprising:
 a first camera mounted at the left front of the vehicle;
 a second camera mounted at the right front of the vehicle;
 a video acquisition device in communication with the first and second cameras, said video acquisition device receiving raw images from the first and second cameras;
 a user input device for allowing a driver of the vehicle to signal that he or she wants to activate a front curb view display;
 a heuristics module for detecting a frontal parking maneuver, said heuristics module including a vehicle state module for evaluating vehicle speed and steering angle, an image analysis module for detecting a curb or parking space ahead of the vehicle, and a map module for determining from Global Positioning System and digital map data that the vehicle is in a parking lot;
 a learning module in communication with the heuristics module and the user input device, the learning module configured to:
  (A) determine when to activate a front curb view display based on (1) preprogrammed learning based on parking view display preferences of a general population of drivers and (2) adaptive learning based on parking view display preferences of the driver of the vehicle; and
  (B) determine what views to include in the front curb view display based on (1) the preprogrammed learning based on the parking view display preferences of the general population of drivers and (2) the adaptive learning based on the parking view display preferences of the driver of the vehicle; and
 a processor including a memory module, said processor being configured to determine activate the front curb view display in response to signals from the user input device, the heuristics module, and the learning module and to generate the front curb view display including enhanced images synthesized from the raw images from the first and second cameras; and
 a display unit in a cockpit area of the vehicle for displaying the front curb view display from the processor for viewing by a driver of the vehicle.

15. The system of claim 14 wherein the processor is configured to activate the front curb view display when the vehicle speed is below a predetermined threshold, a curb or parking space is detected ahead of the vehicle, and the vehicle is determined to be located in a parking lot.

16. The system of claim 14 wherein the processor includes a mode selection module which is configured to select an optimal display mode in the front curb view display based on data from the heuristics module, where the optimal display mode includes one or more views in front of the vehicle which depict a parking space or structure toward which the vehicle is moving.

17. A method for providing enhanced front curb viewing in a vehicle, said method comprising:
 determining a vehicle speed by reading a vehicle speed signal from a vehicle speed sensor;
 determining whether to activate a front curb view display based on whether the vehicle speed is below a speed threshold;
 determining whether to activate the front curb view display based on whether a vehicle driver has selected the front curb view display;
 determining when to activate a front curb view display based on (1) preprogrammed learning based on parking view display preferences of a general population of drivers and (2) adaptive learning based on parking view display preferences of the driver of the vehicle; and
 determining what views to include in the front curb view display based on (1) the preprogrammed learning based on the parking view display preferences of the general population of drivers and (2) the adaptive learning based on the parking view display preferences of the driver of the vehicle; and
 selectively activating the front curb view display;
 processing, using a microprocessor, signals from front-mounted cameras on the vehicle to produce enhanced front curb viewing images for the front curb view display; and
 displaying the front curb view display including the enhanced front curb viewing images on a display device for viewing by the driver.

18. The method of claim 17 further comprising determining whether the vehicle is located in a parking lot based on Global Positioning System data and digital map data, and only activating the front curb view display if the vehicle is located in a parking lot.

19. The method of claim 17 wherein determining whether to activate the front curb view display includes monitoring signals from a microphone and determining whether to activate the front curb view display based on whether the driver has uttered a spoken command to select front curb viewing.

20. The method of claim 17 wherein the views include top-down and perspective orientations, and the views include straight-ahead, front-left and front-right directions.

21. The method of claim 17 wherein displaying the front curb view display including the enhanced front curb viewing images includes synthesizing a top-down display from the signals from the front-mounted cameras, and further includes synthesizing a bird's-eye view from the signals from the front-mounted cameras and signals from rear-mounted and side-mounted cameras.

* * * * *